(12) United States Patent
Hirose et al.

(10) Patent No.: US 11,291,923 B2
(45) Date of Patent: Apr. 5, 2022

(54) SELF-PROPELLED TOY AND GAME SYSTEM

(71) Applicant: NINTENDO CO., LTD., Kyoto (JP)

(72) Inventors: Shinji Hirose, Kyoto (JP); Kosuke Nakamura, Kyoto (JP); Hiroki Ikuta, Kyoto (JP); Masaki Amano, Kyoto (JP); Takaki Fujino, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 17/003,098

(22) Filed: Aug. 26, 2020

(65) Prior Publication Data
US 2021/0291067 A1    Sep. 23, 2021

(30) Foreign Application Priority Data

Mar. 19, 2020    (JP) .............................. JP2020-050150

(51) Int. Cl.
*A63H 17/26*     (2006.01)
*A63H 29/22*     (2006.01)
*A63H 30/04*     (2006.01)
*A63H 17/28*     (2006.01)
*H04N 7/18*      (2006.01)

(52) U.S. Cl.
CPC ........... *A63H 30/04* (2013.01); *A63H 17/262* (2013.01); *A63H 17/28* (2013.01); *A63H 29/22* (2013.01); *H04N 7/18* (2013.01)

(58) Field of Classification Search
CPC ........ A63H 30/04; A63H 29/22; A63H 17/00; A63H 17/262; A63H 17/26; A63H 17/28
See application file for complete search history.

(56) References Cited

U.S. PATENT DOCUMENTS

| | | | | |
|---|---|---|---|---|
| 2,832,177 A | * | 4/1958 | Mueller | A63H 17/00 |
| | | | | 446/462 |
| 3,169,345 A | * | 2/1965 | Marmo | A63H 17/00 |
| | | | | 446/130 |
| 3,629,680 A | * | 12/1971 | Baynes | A63H 29/24 |
| | | | | 320/103 |

(Continued)

FOREIGN PATENT DOCUMENTS

| | | |
|---|---|---|
| CN | 204030689 U | 12/2014 |
| JP | 2004-298538 | 10/2004 |

(Continued)

*Primary Examiner* — Eugene L Kim
*Assistant Examiner* — Alyssa M Hylinski
(74) *Attorney, Agent, or Firm* — Nixon & Vanderhye P.C.

(57) ABSTRACT

The self-propelled toy includes a vehicle body, wheels connected to the vehicle body, a battery provided at the vehicle body, a motor using electric power stored in the battery to output drive power for running use, an imaging device connected to the vehicle body so as to capture an image of an area in front of the self-propelled toy, an operating part operated by a user so as to make the imaging device operate, and a charging port supplying electric power from an outside power source to the battery. The operating part is provided at a top part of the vehicle body at one side from a centerline of vehicle width of the self-propelled toy, and the charging port is provided at a side part of the vehicle body at the same side as the operating part from the centerline of vehicle width.

19 Claims, 16 Drawing Sheets

(56) References Cited

U.S. PATENT DOCUMENTS

| | | | | |
|---|---|---|---|---|
| 4,563,626 A * | 1/1986 | Ohtake | A63H 30/00 320/103 |
| 4,636,178 A * | 1/1987 | Oda | A63H 33/003 446/462 |
| 5,334,076 A * | 8/1994 | Shinozuka | A63H 30/04 320/111 |
| 5,352,147 A * | 10/1994 | Nagel | A63H 17/28 446/409 |
| 5,908,345 A * | 6/1999 | Choi | A63H 17/004 446/436 |
| 6,011,932 A * | 1/2000 | Craig | A63H 17/00 396/433 |
| 6,746,304 B1 * | 6/2004 | Liu | A63H 17/00 446/454 |
| 8,764,511 B2 * | 7/2014 | Verbera | A63H 17/262 446/465 |
| 2001/0045978 A1 * | 11/2001 | McConnell | H04N 13/239 348/42 |
| 2002/0111117 A1 * | 8/2002 | Ho | A63H 17/32 446/456 |
| 2002/0132556 A1 * | 9/2002 | So | A63H 30/04 446/456 |
| 2003/0040255 A1 * | 2/2003 | Hauptner | A63H 29/22 446/484 |
| 2006/0223637 A1 * | 10/2006 | Rosenberg | A63F 13/92 463/47 |
| 2006/0293102 A1 * | 12/2006 | Kelsey | A63H 30/04 463/37 |
| 2011/0269365 A1 * | 11/2011 | Goff | A63H 3/00 446/72 |
| 2012/0052767 A1 * | 3/2012 | Martino | A63H 17/44 446/465 |
| 2012/0171924 A1 * | 7/2012 | Karnick | A63H 17/05 446/236 |
| 2015/0174501 A1 * | 6/2015 | Young | A63H 17/26 446/456 |
| 2017/0266577 A1 | 9/2017 | Clarke et al. | |
| 2020/0101594 A1 * | 4/2020 | Chen | A01K 5/0114 |

FOREIGN PATENT DOCUMENTS

| | | |
|---|---|---|
| JP | 2019-213804 A | 12/2019 |
| WO | 01/80212 A1 | 10/2001 |

* cited by examiner

SELF-PROPELLED TOY AND GAME SYSTEM

CROSS-REFERENCE TO RELATED APPLICATION

This application claims priority to Japanese Patent Application No. 2020-050150 filed on Mar. 19, 2020, the entire contents of which are incorporated herein by reference.

TECHNICAL FIELD

The present disclosure relates to a self-propelled toy and a game system.

BACKGROUND

Known in the past has been a self-propelled toy including an imaging device capturing an image of a front area (for example, Japanese Unexamined Patent Publication No. 2004-298538). In such a self-propelled toy, there is room for improvement in user friendliness from the viewpoints of convenience, durability, running performance, etc.

SUMMARY

The summary of the present disclosure is as follows.

(1) A self-propelled toy including: a vehicle body, wheels connected to the vehicle body, a battery provided at the vehicle body, a motor using electric power stored in the battery to output drive power for running use, an imaging device connected to the vehicle body so as to capture an image of an area in front of the self-propelled toy, an operating part operated by a user so as to make the imaging device operate, and a charging port supplying electric power from an outside power source to the battery, wherein the operating part is provided at a top part of the vehicle body at one side from a centerline of vehicle width of the self-propelled toy, and the charging port is provided at a side part of the vehicle body at the same side as the operating part from the centerline of vehicle width.

(2) The self-propelled toy described in above (1), wherein the wheels include at least one front wheel and at least one rear wheel, and the operating part and the charging port are arranged between the at least one front wheel and the at least one rear wheel.

(3) The self-propelled toy described in above (1) or (2), wherein the charging port is arranged at an inside from the outermost part of the wheels in a vehicle width direction.

(4) The self-propelled toy described in above (3), wherein the outermost part of the side part of the vehicle body at which the charging port is provided is positioned at an outside from the outermost part of the wheels in a vehicle width direction.

(5) The self-propelled toy described in any one of above (1) to (4), wherein the wheels are respectively comprised of a tire and a tire wheel, the operating part is a button which is pressed downward, and the vehicle body and the wheels are configured so that a bottom surface of the vehicle body touches a running surface when a downward force causes the tire to be flattened.

(6) The self-propelled toy described in any one of above (1) to (5), wherein the wheels are respectively comprised of a hollow tire and a tire wheel, the operating part is a button which is pressed downward, and the bottommost point of the tire wheel is positioned above a bottom surface of the vehicle body, and a distance in a vertical direction between the bottommost part of the tire wheel and the bottom surface of the vehicle body is equal to or greater than a thickness of the hollow tire.

(7) The self-propelled toy described in any one of above (1) to (6), further including: a board on which a plurality of electronic components are mounted, wherein the vehicle body includes a main chassis, and the board is attached to a top part of the main chassis and the battery is attached to a bottom part of the main chassis.

(8) The self-propelled toy described in above (7), wherein the board has extension parts overlapping the battery in a front-rear direction and extending to an outside from the battery in a vehicle width direction, and at least one electronic component among the plurality of electronic components is mounted on at least one bottom surface of the extension parts.

(9) The self-propelled toy described in above (8), wherein a switch turned on and off by the operating part is mounted on one top surface of the extension parts.

(10) The self-propelled toy described in above (8) or (9), wherein a recessed part for housing the battery is formed at a bottom part of the main chassis and a through hole is formed at a side wall of the recessed part, and a connector is mounted on one bottom surface of the extension parts, and wiring of the battery is connected to the connector through the through hole.

(11) The self-propelled toy described in above 9, wherein the motor is a brushed motor, and the extension parts are positioned at a front from the motor, and at least one wireless communication antenna is mounted on at least one top surface of the extension parts at a front from the switch.

(12) The self-propelled toy described in any one of above (1) to (6), further including: a board on which a plurality of electronic components are mounted, wherein the vehicle wheels include front wheels and rear wheels, the vehicle body includes a main chassis, the board is attached to a top part of the main chassis and has side regions extending to an outside from innermost parts of the front wheels and the rear wheels in a vehicle width direction between the front wheels and the rear wheels, and a switch turned on and off by the operating part is mounted on one top surface of the side regions.

(13) The self-propelled toy described in above (12), wherein the motor is a brushed motor, and the side regions are positioned at a front from the motor, and at least one wireless communication antenna is mounted on at least one top surface of the side regions at a front from the switch.

(14) The self-propelled toy described in any one of above (1) to (13), wherein the vehicle body includes a main chassis and a bottom cover attached to the main chassis and forming a bottom part of the vehicle body, and the self-propelled toy further includes a limiting member limiting movement of the bottom cover in a vertical direction so that a clearance is formed above the bottom cover.

(15) The self-propelled toy described in above (14), wherein the vehicle body further includes a spacer member arranged between the main chassis and the bottom cover, and the limiting member is a stepped screw, fixes the spacer member to the main chassis so that the spacer member abuts against the main chassis, and limits movement of the bottom cover in a vertical direction so that a clearance is formed between the bottom cover and the spacer member.

(16) The self-propelled toy described in any one of above (1) to (15), further including: a support arm extending upward from the vehicle body and connecting the imaging device to the vehicle body, and at least one light emitting diode provided at the support arm so as to be visible from an outside.

(17) The self-propelled toy described in any one of above (1) to (16), further including: a board on which a plurality of electronic components are mounted, wherein the vehicle body includes a driving seat at which a figurine is provided, and the board is arranged below the driving seat, and a switch turned on and off by the operating part overlaps the driving seat in a front-rear direction and is mounted on the board at an outside from the driving seat in a vehicle width direction.

(18) The self-propelled toy described in any one of above (1) to (17), further including: a support arm extending upward from the vehicle body and connecting the imaging device to the vehicle body, wherein the vehicle body includes a driving seat at which a figurine is provided, and the motor is arranged at a rear from the driving seat and the support arm is connected to the vehicle body right above the motor.

(19) A game system including: the self-propelled toy described in any one of above (1) to (18), and a remote control device able to remotely control the self-propelled toy.

BRIEF DESCRIPTION OF THE DRAWINGS

Embodiments of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
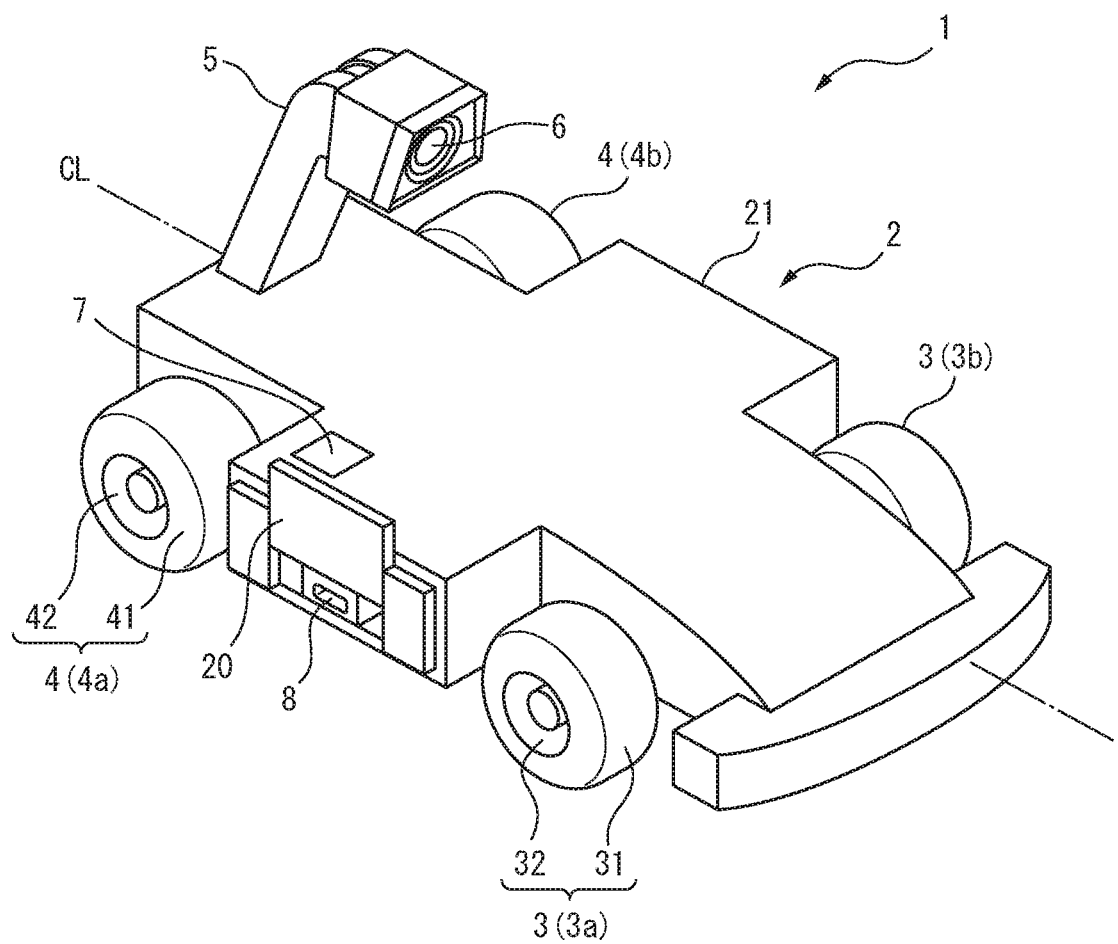
FIG. 1 is a perspective view of a self-propelled toy according to a first embodiment of the present disclosure.

Below, referring to the drawings, embodiments of the present disclosure will be explained in detail. Note that, in the following explanation, similar component elements are assigned the same reference numerals.

First Embodiment

Below, referring to FIG. 1 to FIG. 16, a first embodiment of the present disclosure will be explained.

Figure 2:
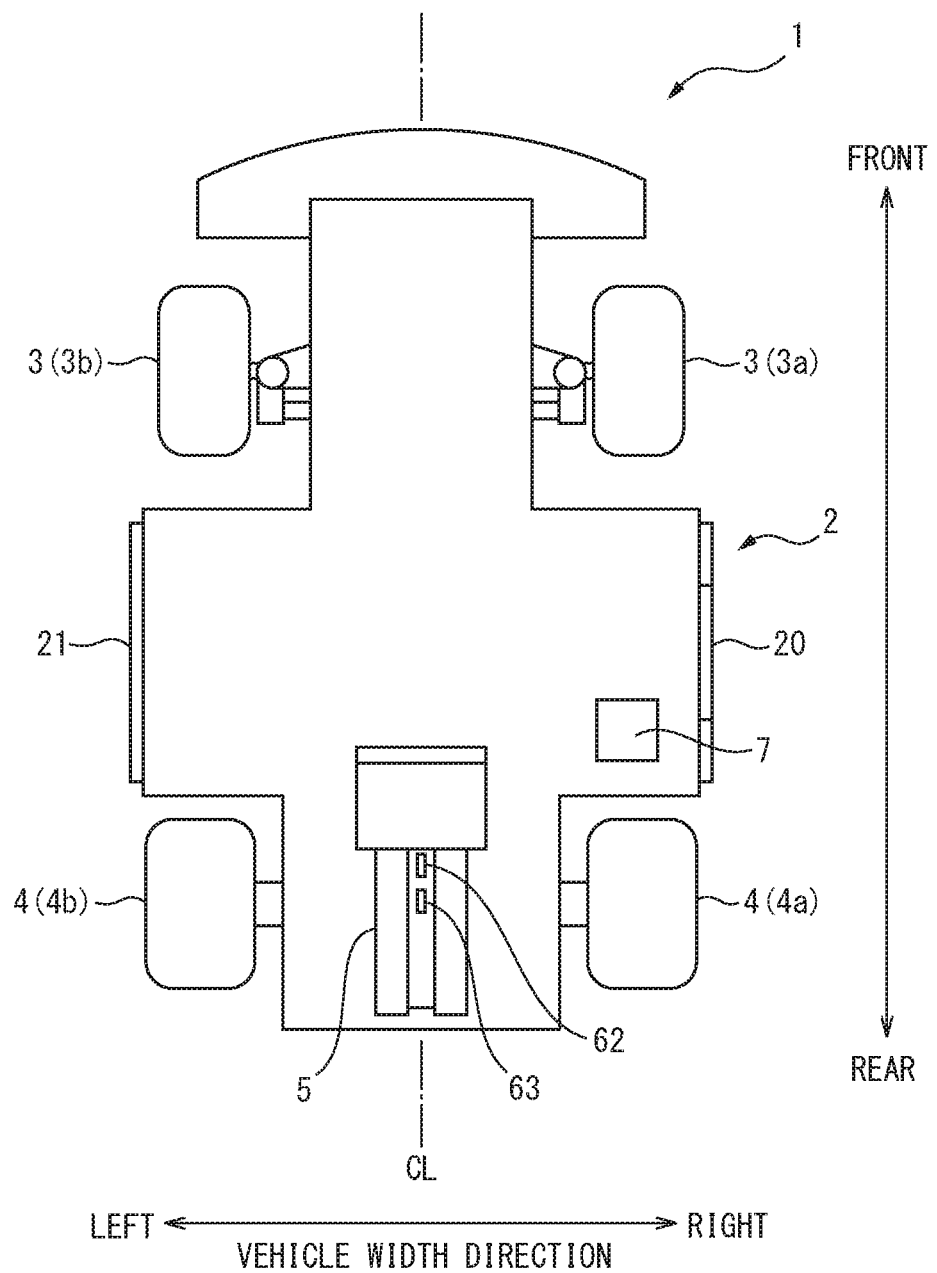
FIG. 2 is a top view of the self-propelled toy according to the first embodiment of the present disclosure.

FIG. 1 is a perspective view of a self-propelled toy 1 according to the first embodiment of the present disclosure, and FIG. 2 is a top view of the self-propelled toy 1 according to the first embodiment of the present disclosure. The self-propelled toy 1 has a substantially symmetrical shape about a centerline CL of vehicle width. As shown in FIG. 1, the self-propelled toy 1 includes a vehicle body 2, wheels (front wheels 3 and rear wheels 4) connected to the vehicle body 2, a support arm 5 extending upward from the vehicle body 2, an imaging device 6 supported by the support arm 5, and an operating part 7 and charging port 8 provided at the vehicle body 2.

The self-propelled toy 1 has an appearance resembling that of an actual vehicle while has a size smaller than an actual vehicle. The self-propelled toy 1 is also called a toy vehicle. In the present embodiment, the self-propelled toy 1 has an appearance resembling an automobile and can run on the ground. For this reason, the self-propelled toy 1 includes, as wheels, two front wheels 3 (right front wheel 3a and left front wheel 3b) and two rear wheels 4 (right rear wheel 4a and left rear wheel 4b). The front wheels 3 are respectively comprised of a front tire 31 and a front tire wheel 32, while the rear wheels 4 are respectively comprised of a rear tire 41 and a rear tire wheel 42. The diameters of the front tire 31 and the front tire wheel 32 are respectively equal to the rear tire 41 and the rear tire wheel 42, and the diameter of the front wheel 3 is equal to the diameter of the rear wheel 4.

Further, the widths of the front tire 31 and the front tire wheel 32 are respectively smaller than the widths of the rear tire 41 and rear tire wheel 42, and the width of the front wheel 3 is shorter than the width of the rear wheel 4. In the present embodiment, the innermost parts of the rear wheels 4 in the vehicle width direction are positioned at the insides from the innermost parts of the front wheels 3, and the outermost parts of the rear wheels 4 are positioned at the outsides from the outermost parts of the front wheels 3.

The vehicle body 2 houses components for driving the self-propelled toy 1 and components for controlling the self-propelled toy 1 and protects these components from impact from the outside.

As shown in FIG. 2, the vehicle body 2 extends in the front-rear direction from the front from the front wheels 3 to the rear from the rear wheels 4 and extends in the vehicle width direction to the outsides from the front wheels 3 and rear wheels 4. For this reason, the vehicle body 2 can protect the front wheels 3 and rear wheels 4 from impact from the front, rear, left, and right. Further, the front end part of the vehicle body 2 positioned at the front from the front wheels 3 extends to the outside from the innermost parts of the front wheels 3 in the vehicle width direction. Due to this, the front end part of the vehicle body 2 functions as a bumper and can effectively protect the self-propelled toy 1 from impact from the front.

As shown in FIG. 1 and FIG. 2, the vehicle body 2 includes a main cover 21 forming the top part, front part, side parts, and rear part of the vehicle body 2. The main cover 21 covers the components housed in the vehicle body 2 so that these components cannot be seen from the outside. The main cover 21 functions as the exterior of the self-propelled toy 1 and defines the outer shape of the self-propelled toy 1.

Further, the vehicle body 2 includes an opening lid 20 covering a charging port 8. The opening lid 20 is attached to the main cover 21 to be able to open and close. The opening lid 20 together with the main cover 21 forms one side part of the vehicle body 2 (in the present embodiment, the right side part of the vehicle body 2). FIG. 1 shows the self-propelled toy 1 when the opening lid 20 is opened. When opened, the opening lid 20 exposes the charging port 8 to the outside, while when closed, it conceals the charging port 8 from the outside. In the present embodiment, the opening lid 20 is configured to open and close in the vertical direction in a sliding manner Note that, the opening lid 20 may be configured to open and close in another opening and closing manner (for example, open and close in a hinge manner or open and close to left and right in a sliding manner).

The charging port 8 is used for charging a battery provided at the vehicle body 2 and, for example, is configured as a USB connector. When the battery is not being charged, the charging port 8 is covered by the opening lid 20 so that foreign matter can be kept from entering the charging port 8. Further, the opening lid 20 can protect the charging port 8 from impact from the outside. Note that details of the battery will be explained later.

In the present embodiment, as will be understood from FIG. 1, the charging port 8 is provided at the side part of the vehicle body 2 at one side from the centerline CL of vehicle width of the self-propelled toy 1, and the opening lid 20 forms the side part of the vehicle body 2 at the same side as the charging port 8 from the centerline CL of vehicle width. Due to this, a user can easily access the charging port 8 from the side of the self-propelled toy 1 through the opening lid 20. Further, when connecting the charging port 8 of the self-propelled toy 1 set horizontally to an outside power source, a connection cord connecting the charging port 8 to the outside power source can be kept from entangling with the wheels 3, 4 etc. Note that, in the present embodiment, the charging port 8 is provided at the right side part of the vehicle body 2, but the charging port 8 may be provided at the left side part of the vehicle body 2.

Below, the configuration for using the self-propelled toy 1 to capture an image will be explained. The imaging device 6 shown in FIG. 1, for example, is a CMOS (complementary metal oxide semiconductor) camera or a CCD (charge coupled device) camera and is connected to the vehicle body 2 so as to capture an image of the area in front of the self-propelled toy 1.

In the present embodiment, the imaging device 6 is connected to the vehicle body 2 through the support arm 5. The support arm 5 is connected to the vehicle body 2 between the right rear wheel 4a and the left rear wheel 4b and extends toward the front upward at a slant. The imaging device 6 is housed in the support arm 5 and is arranged at a front end part of the support arm 5. As a result, the imaging device 6 is positioned at the topmost part of the self-propelled toy 1 and is positioned in front of the rear wheels 4. The front end of the support arm 5 is closed, and the imaging device 6 captures an image of the front area through a transparent or semitransparent part of the support arm 5.

Further, as shown in FIG. 2, the support arm 5 and imaging device 6 are arranged at a region near the center in the vehicle width direction (a center region among regions when self-propelled toy 1 is divided into three equal parts in vehicle width direction). Due to this, it is possible to keep the balance of weights of the left and right of the self-propelled toy 1 from deteriorating and in turn possible to keep the running performance of the self-propelled toy 1 from falling.

In the present embodiment, the support arm 5 and imaging device 6 are arranged on the centerline CL of vehicle width. Specifically, the support arm 5 and imaging device 6 are arranged so that the center of the imaging device 6 is positioned on the centerline CL of vehicle width. Further, the support arm 5 and imaging device 6 are arranged so that when the self-propelled toy 1 is set horizontal, the optical axis of the imaging device 6 slants downward with respect to the horizontal direction (for example, by 5° to 15°). Due to such placement, in the present embodiment, the front part of the vehicle body 2, the right front wheels 3a, the left front wheels 3b, and the front area of the self-propelled toy 1 are contained in the angle of view of the imaging device 6, and the imaging device 6 captures these.

Figure 3:
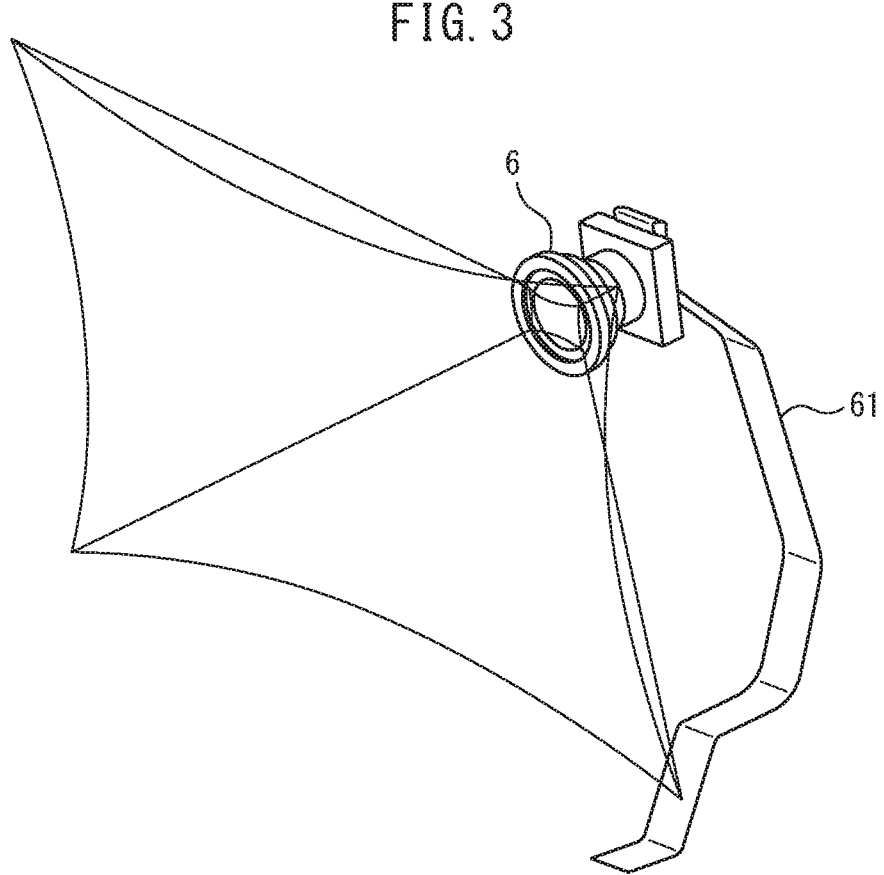
FIG. 3 is a disassembled perspective view of the imaging device of the self-propelled toy.
Figure 4:
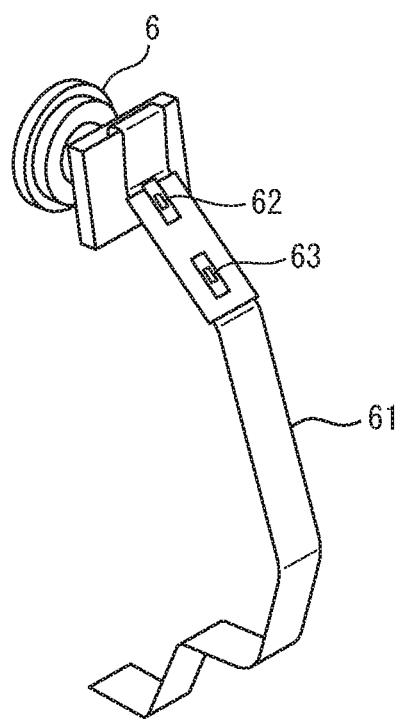
FIG. 4 is a disassembled perspective view of the imaging device of the self-propelled toy.

FIG. 3 and FIG. 4 are disassembled perspective views of the imaging device 6 of the self-propelled toy 1. FIG. 3 shows the front part of the imaging device 6 and the range of capture of the imaging device 6, while FIG. 4 shows the rear part of the imaging device 6. As shown in FIG. 3 and FIG. 4, a camera-use FPC 61 is connected to the imaging device 6. The camera-use FPC 61 extends inside the support arm 5 and is connected to a later explained board.

Further, as shown in FIG. 4, the self-propelled toy 1 includes a first light emitting diode (LED) 62 emitting blue light and a second light emitting diode (LED) 63 emitting red light. The first LED 62 and the second LED 63 are provided at the support arm 5 so as to be visible from the outside. For example, the first LED 62 is turned on when the imaging device 6 is being operated, while the second LED 63 is turned on when the battery is being charged. Due to this, a user can easily grasp the state of the self-propelled toy 1 from a separate location.

In the present embodiment, the first LED 62 and the second LED 63 are mounted on the camera-use FPC 61. Therefore, as shown in FIG. 2, the first LED 62 and the second LED 63 are arranged inside the support arm 5 and are visible from above and behind the self-propelled toy 1 through a transparent or semitransparent part of the support arm 5. As explained above, the imaging device 6, the first LED 62, and the second LED 63 are arranged inside the support arm 5. Due to this, it is possible to keep the user from mistakenly touching these and in turn possible to improve their durabilities.

Note that, the configuration and functions of the LEDs provided at the support arm 5 are not limited to the above. For example, the first LED 62 and the second LED 63 may emit different color light. Further, one of the first LED 62 and the second LED 63 may be omitted or the first LED 62 and the second LED 63 may be made integral. Further, the first LED 62 and the second LED 63 may be connected to the board by wiring (FPC or lead wires) different from the camera-use FPC 61. Further, there may be three or more LEDs.

The user switches the operating state of the imaging device 6 using the operating part 7 shown in FIG. 1 and FIG. 2. That is, the operating part 7 is operated by the user for making the imaging device 6 operate. For example, when the imaging device 6 is capturing a still image, the user operates the operating part 7 to determine the shutter timing. Further, when the imaging device 6 captures a moving image, the user operates the operating part 7 to make the imaging device 6 start up. In this case, the operating part 7 is operated to turn on the power of the self-propelled toy 1, and when the operating part 7 is operated or after a predetermined time (for example, several seconds to tens of seconds) after the operating part 7 is operated, image capture by the imaging device 6 is started. Further, the operating part 7 is operated to turn on the power of the self-propelled toy 1, and then image capture by the imaging device 6 may be started based on instruction from an outside apparatus. That is, operation of the operating part 7 may be one of the conditions for start of image capture. In this way, the operating part 7 is operated by the user to directly or indirectly make the imaging device 6 operate. Further, the operating part 7 may also be operated by the user when the user turns off the power of the self-propelled toy 1.

At the time of use, the self-propelled toy 1 is basically set on the floor or other running surface. Therefore, the user usually sees the top part of the self-propelled toy 1. Accordingly, in the present embodiment, the operating part 7 is provided on the top part of the vehicle body 2. By doing this, the user frequently sees the operating part 7 and in turn can easily grasp the position of the operating part 7. Further, the user can easily access the operating part 7 from above the vehicle body 2.

Further, as shown in FIG. 1 and FIG. 2, the operating part 7 is provided at the top part of the vehicle body 2 at one side from the centerline CL of vehicle width. Due to this, when the user is holding the self-propelled toy 1 substantially horizontally by his or her two hands to capture an image of the area in front of the self-propelled toy 1, operation of the operating part 7 by one hand becomes easy. In the present embodiment, the operating part 7 is provided at the top right part of the vehicle body 2, specifically at the top right part of the main cover 21. In this case, when using the self-propelled toy 1 to capture an image of an object in front of it, the user can operate the operating part 7 by his or her right hand, while when using the self-propelled toy 1 to capture an image of the user himself or herself, he or she can operate the operating part 7 by his or her left hand. Note that, the operating part 7 may be provided at the top left part of the vehicle body 2.

The operating part 7 is, for example, configured as an operating button pressed downward. The operating part 7 extends downward from the top surface of the vehicle body 2 and moves in the vertical direction by operation by the user. Further, the operating part 7 is housed in the vehicle body 2 so that the top surface of the operating part 7 becomes flush with the top surface of the vehicle body 2 (in the present embodiment, the top surface of the main cover 21). Due to this, it is possible to reduce the incidence of the operating part 7 being mistakenly operated when the self-propelled toy 1 flips over or is struck without causing a drop in the ease of operation of the operating part 7.

Further, as shown in FIG. 1, the charging port 8 is provided at the side part of the vehicle body 2 at the same side as the operating part 7 from the centerline CL of vehicle width. By doing this, even if the charging port 8 is provided at the side part of the vehicle body 2, the user can easily grasp the position of the charging port 8 using the operating part 7 as a locator. This advantage becomes particularly remarkable if, like in the present embodiment, the charging port 8 is covered by the opening lid 20. Further, if the user finds by operation of the operating part 7 that the battery does not have sufficient electric power, for example, if when operating the operating part 7 the self-propelled toy 1 (specifically the imaging device 6 etc.) does not react, it is possible to quickly access the charging port 8 at the same side as the operating part 7 to start charging the battery. Therefore, due to the arrangement of the above-mentioned operating part 7 and charging port 8, the user friendliness of the self-propelled toy 1 can be improved.

Further, the operating part 7 and charging port 8 are arranged between the front wheels 3 and the rear wheels 4. For this reason, the front wheels 3 can protect the operating part 7 and charging port 8 from impact from the front, while the rear wheels 4 can protect the operating part 7 and charging port 8 from impact from the rear.

Figure 5:
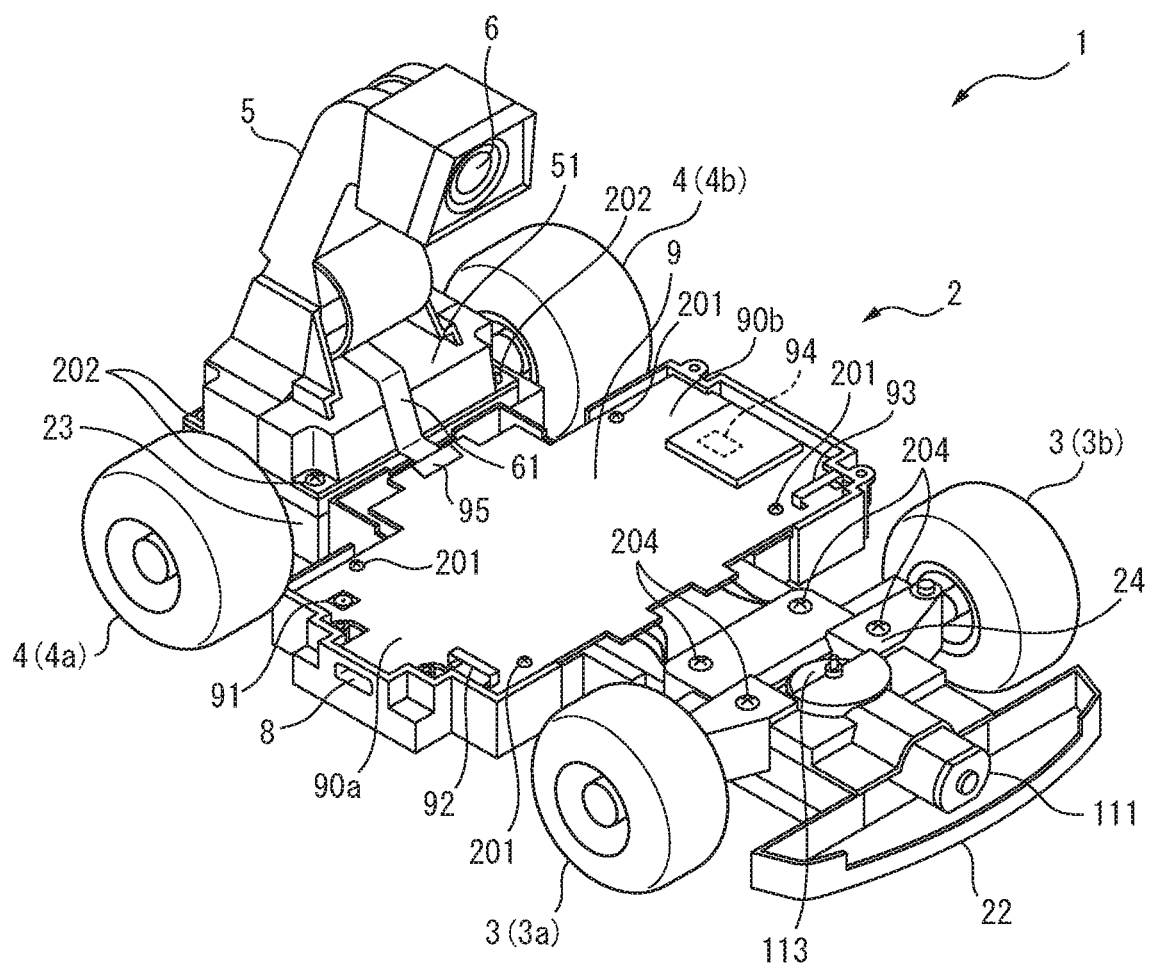
FIG. 5 is a perspective view of the self-propelled toy showing the inside of a vehicle body.

FIG. 5 is a perspective view of the self-propelled toy 1 showing the inside of the vehicle body 2. FIG. 5 shows the self-propelled toy 1 when the main cover 21 is detached. As shown in FIG. 5, the vehicle body 2 includes a main chassis 22. The main chassis 22 extends in the front-rear direction from the front of the front wheels 3 to the rear of the rear wheels 4 and holds the later explained main components of the self-propelled toy 1.

As shown in FIG. 5, the self-propelled toy 1 includes a board 9 on which a plurality of electronic components are mounted. The board 9 is attached to the top part of the main chassis 22, and the main chassis 22 holds the board 9. In the present embodiment, the board 9 is fixed by screws 201 to the top part of the main chassis 22. Further, as shown in FIG. 5, the board 9 extends between the front wheels 3 and the rear wheels 4 and extends in the vehicle width direction from the right front wheel 3a and the right rear wheel 4a to the left front wheel 3b and the left rear wheel 4b.

The above-mentioned support arm 5 is connected to the main chassis 22 at the rear from the board 9. Specifically, the support arm 5 is connected to the main chassis 22 between the right rear wheel 4a and the left rear wheel 4b. In the present embodiment, the support arm 5 has a fastening part 51 arranged inside the main cover 21 and is fixed through the fastening part 51 by screws 202 to the top part of the main chassis 22.

Figure 6:
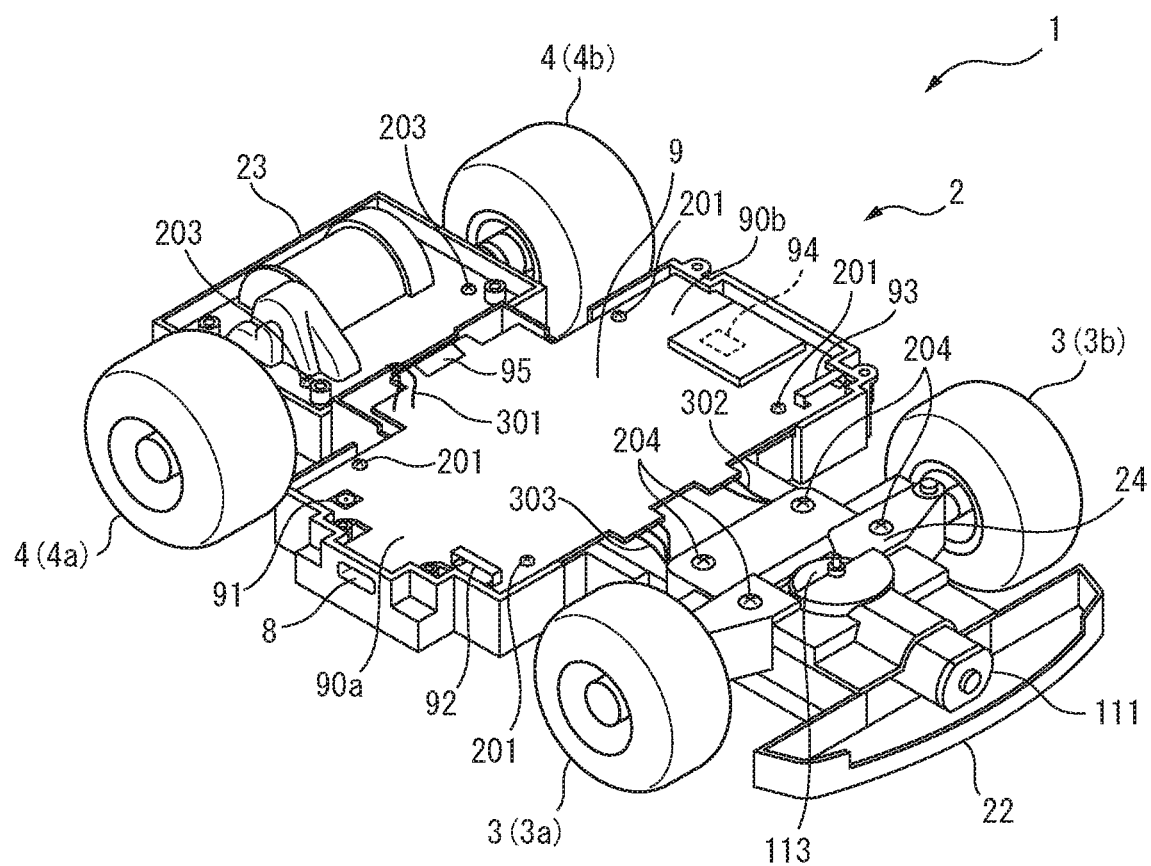
FIG. 6 is a perspective view of the self-propelled toy showing the inside of the vehicle body.

FIG. 6 is a perspective view of the self-propelled toy 1 showing the inside of the vehicle body 2. FIG. 6 shows the self-propelled toy 1 of FIG. 5 when the support arm 5 is detached from the self-propelled toy 1. The vehicle body 2 includes a drive part cover 23 covering a later explained drive member and a steering part cover 24 covering a later explained steering member.

The drive part cover 23 is arranged between the support arm 5 and the main chassis 22 in the vertical direction and is attached to the top part of the main chassis 22 at the rear from the board 9. Specifically, the drive part cover 23 is fixed between the right rear wheel 4a and the left rear wheel 4b by screws 203 to the top part of the main chassis 22. The steering part cover 24 is attached to the top part of the main chassis 22 at the front from the board 9. Specifically, the steering part cover 24 is fixed between the right front wheel 3a and the left front wheel 3b by screws 204 to the top part of the main chassis 22.

Figure 7:
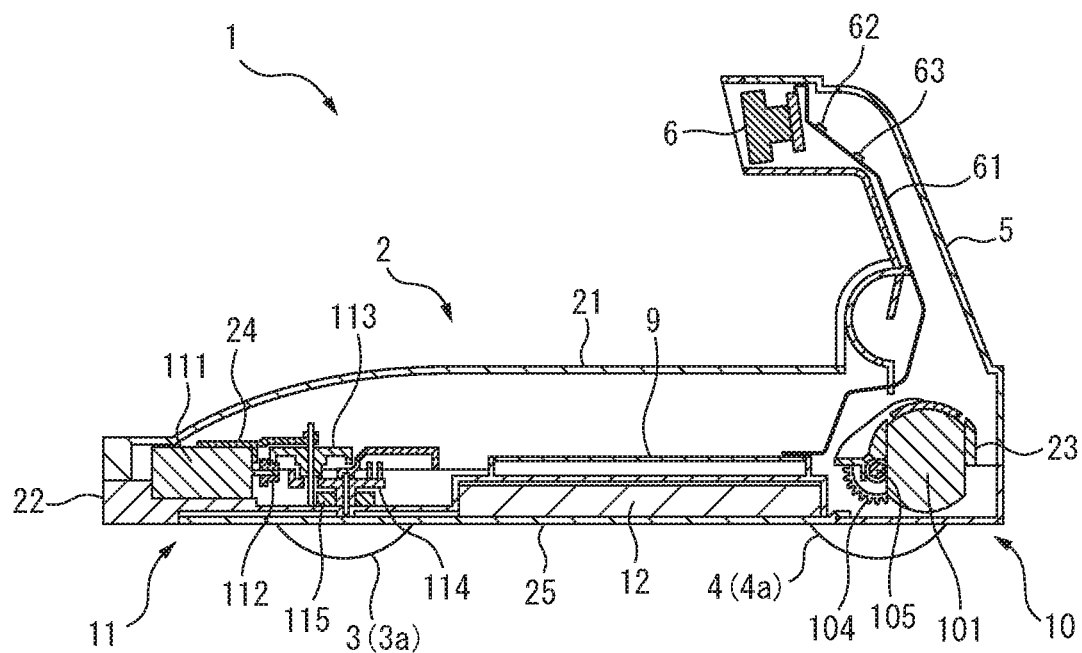
FIG. 7 is a left side cross-sectional view of the self-propelled toy along a centerline of the vehicle width.

FIG. 7 is a left side cross-sectional view of the self-propelled toy 1 along the centerline CL of vehicle width. As shown in FIG. 7, the self-propelled toy 1 includes a drive member 10, a steering member 11, and a battery 12. The drive member 10, the steering member 11, and the battery 12 are provided at the vehicle body 2.

The drive member 10 uses electric power stored in the battery 12 to drive the rear wheels 4. The steering member 11 uses the electric power stored in the battery 12 to steer the front wheels 3. The battery 12 is a secondary battery able to be charged by an outside power source and, for example, is a lithium ion battery, nickel-hydrogen battery, etc.

Figure 8:
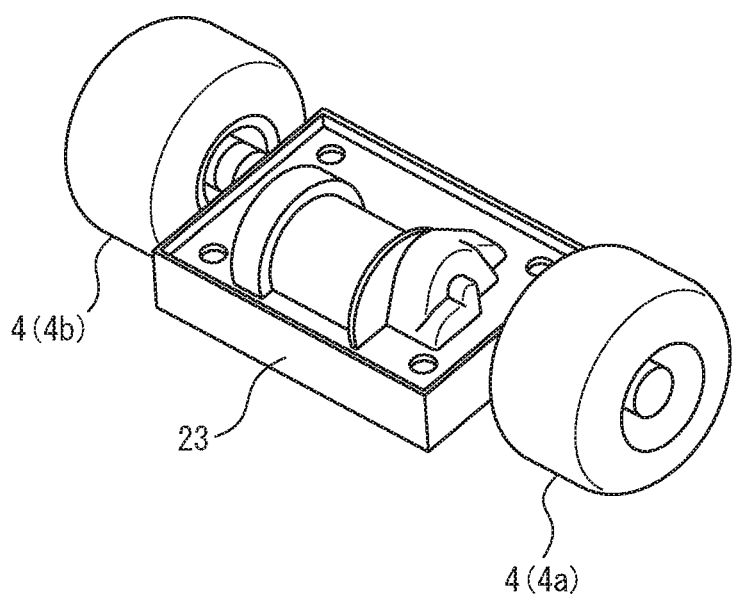
FIG. 8 is a disassembled perspective view of a drive part cover and rear wheels of the self-propelled toy.
Figure 9:
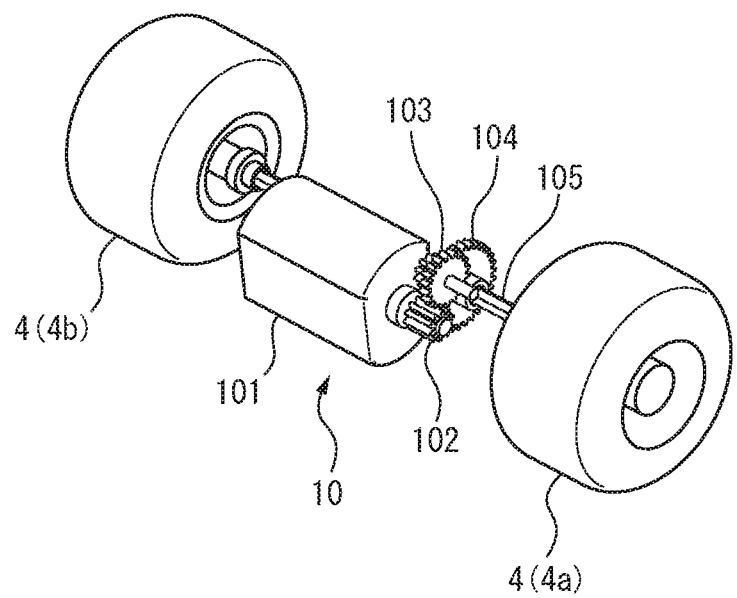
FIG. 9 is a view showing a drive member inside the drive part cover of FIG. 8.

FIG. 8 is a disassembled perspective view of the drive part cover 23 and the rear wheels 4 of the self-propelled toy 1, while FIG. 9 is a view showing the drive member 10 in the drive part cover 23 of FIG. 8. As shown in FIG. 9, the drive member 10 includes a drive motor 101, pinion gear 102, counter gear 103, spur gear 104, and wheel shaft 105.

The drive motor 101 uses electric power stored in the battery 12 to output drive power for running use (driving power). The drive motor 101 is a DC motor, for example, a brushed motor or a brushless motor. The pinion gear 102 is connected to the drive motor 101, the spur gear 104 is connected to the wheel shaft 105, and the counter gear 103 is arranged between the pinion gear 102 and the spur gear 104. The pinion gear 102, the counter gear 103, and the spur gear 104 convert rotation of the drive motor 101 to rotation of the wheel shaft 105. The rear wheels 4 are connected to the both ends of the wheel shaft 105 and rotate together with the wheel shaft 105. Therefore, the drive member 10 can drive the rear wheels 4.

As will be understood from FIG. 8 and FIG. 9, the drive motor 101, the pinion gear 102, the counter gear 103, and the spur gear 104 are housed in the drive part cover 23, while the wheel shaft 105 is connected to the drive part cover 23. Therefore, the drive member 10 is held by the drive part cover 23 and is positioned by the drive part cover 23. That is, since, in the present embodiment, the drive member 10 is positioned by a single component (the drive part cover 23), it is possible to raise the positioning precision among components of the drive member 10.

The drive member 10 and the rear wheels 4 are connected through the drive part cover 23 to the main chassis 22. As a result, the main chassis 22 holds the drive member 10 and the rear wheels 4 through the drive part cover 23. At this time, the drive motor 101 is arranged in a region near the center in the vehicle width direction. Due to this, it is possible to keep the balance of weights of the left and right of the self-propelled toy 1 from deteriorating and in turn possible to keep the running performance of the self-propelled toy 1 from falling.

Figure 10:
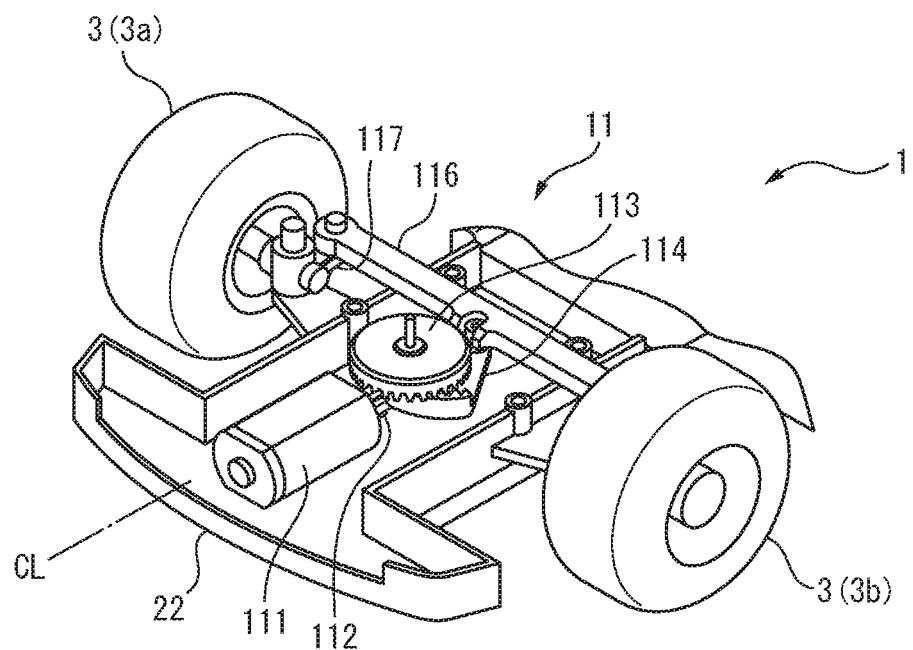
FIG. 10 is a partial perspective view of the self-propelled toy showing the inside of the vehicle body.

FIG. 10 is a partial perspective view of the self-propelled toy 1 showing the inside of the vehicle body 2. FIG. 10 shows the front part of the self-propelled toy 1 when the main cover 21 and the steering part cover 24 are detached. As shown in FIG. 7 and FIG. 10, the steering member 11 includes a steering-use motor 111, a pinion gear 112, a crown gear 113, a sector gear 114, a potentiometer 115, a tie rod 116, and knuckle arms 117.

The steering-use motor 111, the pinion gear 112, the crown gear 113, the sector gear 114, and the potentiometer 115 are housed in the main chassis 22 and held by the main chassis 22. Further, the tie rod 116, the knuckle arms 117, and the front wheels 3 are connected to the main chassis 22 so that the front wheels 3 can be turned to the left and right. Therefore, the main chassis 22 holds the steering member 11 and the front wheels 3.

The steering-use motor 111 uses electric power stored in the battery 12 to output drive power for steering use. The steering-use motor 111 is a DC motor, for example, a brushed motor or a brushless motor. As shown in FIG. 10, the steering-use motor 111 is arranged in a region near the center in the vehicle width direction. In particular, in the present embodiment, the steering-use motor 111 is arranged so that its axis matches the centerline CL of vehicle width. Due to this, it is possible to keep the balance of weights of the left and right of the self-propelled toy 1 from deteriorating and in turn possible to keep the running performance of the self-propelled toy 1 from falling.

The pinion gear 112 is connected to the steering-use motor 111, the sector gear 114 is connected to the tie rod 116, and the crown gear 113 is arranged between the pinion gear 112 and the sector gear 114. The pinion gear 112, the crown gear 113, and the sector gear 114 convert rotation of the steering-use motor 111 to linear motion of the tie rod 116. Due to linear motion of the tie rod 116, the knuckle arms 117 swing back and forth and the orientation of the front wheels 3 connected to the knuckle arms 117 changes to the left and right. Therefore, the steering member 11 can steer the front wheels 3.

As shown in FIG. 7, the potentiometer 115 is arranged below the sector gear 114 and detects a rotational angle of the sector gear 114. The steering-use motor 111 is controlled based on the output of the potentiometer 115 so that the steering angle of the front wheels 3 becomes the target value. Note that, instead of the steering-use motor 111, the potentiometer 115, etc., a servo motor may be used.

Further, as shown in FIG. 7, the drive motor 101 is arranged at the rear from the board 9 and the battery 12, specifically is arranged between the right rear wheel 4a and the left rear wheel 4b. On the other hand, the steering-use motor 111 is arranged at the front from the board 9 and the battery 12, specifically is arranged in the front of the front wheels 3. Among the components held by the main chassis 22 (the board 9, the components on the board 9, the battery 12, the components of the drive member 10, and the components of the steering member 11), the length of the drive motor 101 in the vertical direction is the maximum, and the length of the steering-use motor 111 in the vertical direction is the second most longest. For this reason, it is possible to arrange the drive motor 101 and the steering-use motor 111 in front of and behind the board 9 and the battery 12, and thereby keep the height of the vehicle body 2 from becoming greater.

Figure 11:
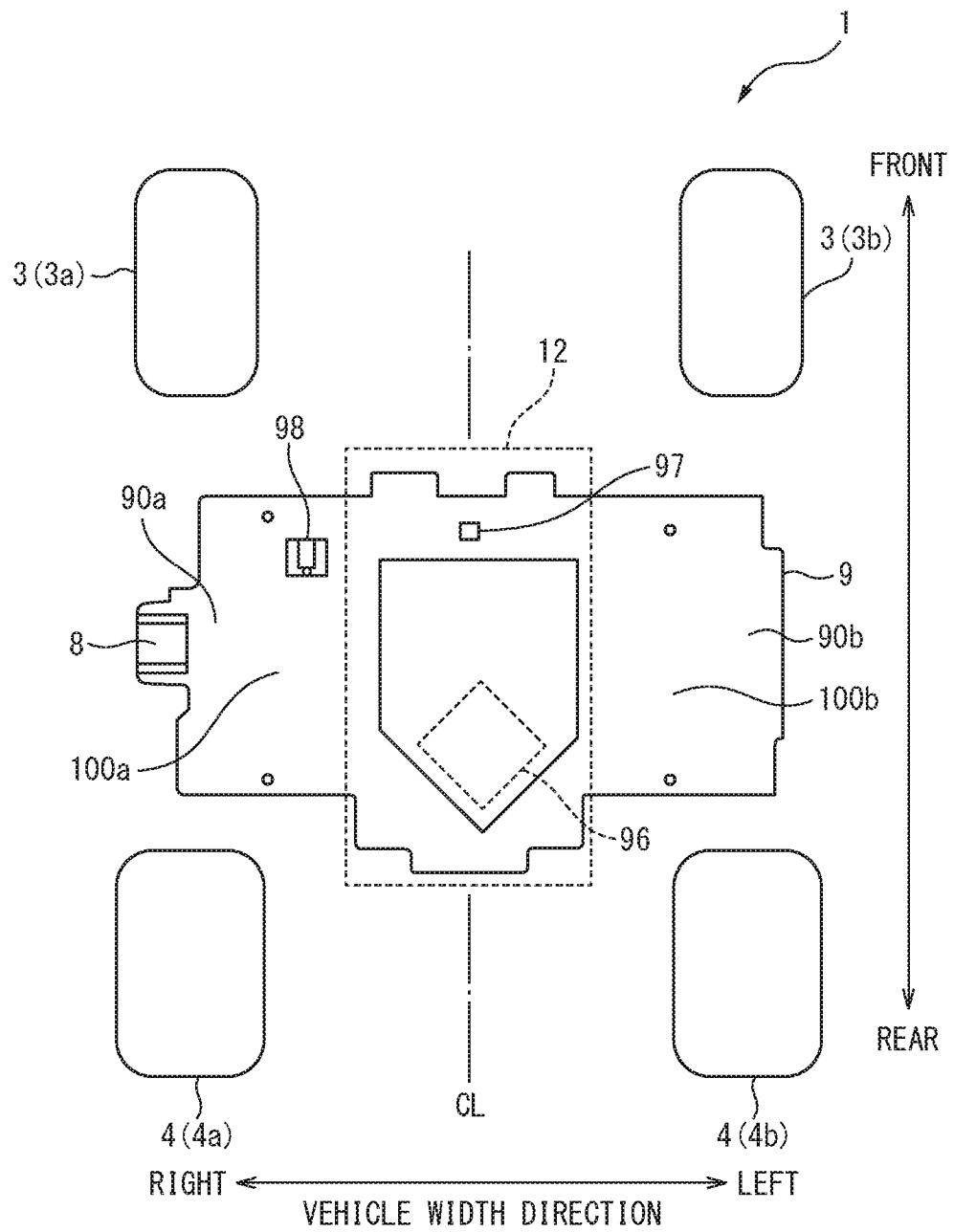
FIG. 11 is a bottom view of the wheels and board of the self-propelled toy.

Next, the positional relationship between the board 9 and the battery 12 will be explained in detail. FIG. 11 is a bottom view of the wheels 3, 4 and board 9 of the self-propelled toy 1. FIG. 11 shows the wheels 3, 4 and board 9 when viewing the self-propelled toy 1 from the bottom. In order to show the positional relationship with the board 9, the battery 12 positioned below the board 9 is shown by broken lines.

In the present embodiment, the board 9 and the battery 12 are arranged so as to at least partially overlap in a horizontal plane (plane shown in FIG. 11). In other words, the board 9 and the battery 12 are arranged so as to at least partially overlap in a top view and a bottom view of the self-propelled toy 1. By doing this, the board 9 and the battery 12 can be reduced in areas occupied compared to when arranging the board 9 and battery 12 side by side on the same plane.

As shown in FIG. 11, the length of the board 9 in the longer direction becomes longer than the length of the battery 12 in the shorter direction, while the length of the battery 12 in the longer direction is longer than the length of the board 9 in the shorter direction. Further, as will be understood from FIG. 11, the area of the board 9 is larger than the area of the battery 12 in a horizontal plane. Under these conditions, in the present embodiment, the board 9 and the battery 12 are arranged so as to perpendicularly intersect in the horizontal plane. In this case, compared to when arranging the board 9 and the battery 12 so that the battery 12 fits inside the board 9 in the horizontal plane, the areas occupied by the board 9 and the battery 12 become slightly larger, but the area of the board 9 at the outside of the battery 12 can be made larger.

Furthermore, in the present embodiment, the perpendicularly arranged board 9 and battery 12 are arranged so that the longer direction of the board 9 matches the vehicle width direction. As will be understood from FIG. 11, the length of the board 9 in the longer direction is longer than the length of the battery 12 in the longer direction. For this reason, compared to when arranging the board 9 and the battery 12 so that the longer direction of the board 9 matches the front-rear direction, it is possible to reduce the length of the board 9 and the battery 12 in the front-rear direction. Therefore, if arranging the drive member 10 and the steering member 11 in front of and behind the board 9 and the battery 12, it is possible to reduce the length of the self-propelled toy 1 in the front-rear direction and in turn improve the turning performance of the self-propelled toy 1.

Further, as shown in FIG. 11, the battery 12 is arranged in a region near the center in the vehicle width direction. In particular, in the present embodiment, the battery 12 is arranged so that the centerline matches the centerline CL of vehicle width. Due to this, it is possible to keep the balance of weights of the left and right of the self-propelled toy 1 from deteriorating and in turn possible to keep the running performance of the self-propelled toy 1 from falling.

Below, the main electronic components mounted on the board 9 will be explained. First, referring to FIG. 5 and FIG. 6, the electronic components on the top surface of the board 9 will be explained. As shown in FIG. 5 and FIG. 6, on the top surface of the board 9, a switch 91 turned on and off by the operating part 7, a first antenna 92 and a second antenna 93 for wireless communication, a wireless communication IC 94 covered by a shield, and a camera-use connector 95 are mounted.

As shown in FIG. 5 and FIG. 6, the board 9 has two side regions (a right side region 90*a* and a left side region 90*b*) extending to the outside from the innermost parts of the front wheels 3 and rear wheels 4 in the vehicle width direction. The switch 91 and the first antenna 92 are mounted on the top surface of one side region of the board 9 (in the present embodiment, the right side region 90*a*), while the second antenna 93 and the wireless communication IC 94 are mounted on the top surface of the other side region of the board 9 (in the present embodiment, the left side region 90*b*). By mounting these electronic components on the side regions of the board 9, it is possible to effectively utilize the space between the front wheels 3 and the rear wheels 4.

The switch 91 is arranged right below the above-mentioned operating part 7 and is turned on and off by the operating part 7. In the present embodiment, the switch 91 is turned on and off when the operating part 7 moves downward to push down the switch 91. When the switch 91 is turned on by the operating part 7, as explained above, the imaging device 6 is directly or indirectly operated.

Note that, in the present embodiment, the operating part 7 and the switch 91 are separate members, but the operating part 7 and the switch 91 may be integral. In this case, the operating part 7 and the switch 91 are, for example, configured as a pushbutton switch, a slide switch, a toggle switch, a rocker switch, etc.

The first antenna 92 and the second antenna 93 for wireless communication are configured in the same way and respectively send and receive electric waves. The first antenna 92, the second antenna 93, and the wireless communication IC 94 are configured so as to send data to an outside apparatus and receive data from the outside apparatus. For example, the first antenna 92, the second antenna 93, and the wireless communication IC 94 receive control signals for controlling the self-propelled toy 1 from the outside apparatus and send images captured by the imaging device 6 to the outside apparatus. That is, in the present embodiment, the self-propelled toy 1 is a so-called radio-controlled toy vehicle.

Usually, while running, the self-propelled toy 1 sends data toward the outside apparatus above the self-propelled toy 1 and receives data from the outside apparatus above the self-propelled toy 1. For this reason, as explained above, it is possible to raise the communication strength by mounting the first antenna 92 and the second antenna 93 on the top surface of the board 9.

Further, in the present embodiment, as shown in FIG. 6, the first antenna 92 and the second antenna 93 are arranged at the both end parts of the board 9 in the vehicle width direction and are mounted so that axes of the longer directions of the first antenna 92 and the second antenna 93 perpendicularly intersect, whereby it is possible to keep the communication strength from falling along with change of the relative position of the self-propelled toy 1 and outside apparatus.

Further, the first antenna 92 and the second antenna 93 are mounted at the front end part of the board 9. Therefore, the first antenna 92 is mounted on the top surface of the right side region 90*a* of the board 9 at the front from the switch 91, while the second antenna 93 is mounted on the top surface of the left side region 90*b* of the board 9 at the front from the wireless communication IC 94. By doing this, it is possible to increase the distance between the first antenna 92 and the second antenna 93 and the drive motor 101 arranged at the rear from the board 9 while arranging a plurality of electronic components at the same side region. As a result, the noise generated from the drive motor 101 can be kept from interfering with wireless communication by the first antenna 92 and the second antenna 93. This advantage is particularly remarkable when the drive motor 101 is a brushed motor with large noise.

As shown in FIG. 5, a camera-use FPC 61 is connected to the camera-use connector 95. The camera-use FPC 61 is connected to the camera-use connector 95 along the top of the fastening part 51 from the inside of the support arm 5. In the present embodiment, the camera-use connector 95 is mounted on the rear end part of the board 9 in the region near the center in the vehicle width direction and is positioned on the centerline CL of vehicle width. The imaging device 6, the first LED 62, and the second LED 63 are electrically connected through the camera-use FPC 61 to the board 9 and are supplied with electric power from the battery 12.

Further, as shown in FIG. 6, wiring 301 (two lead wires) of the drive motor 101 is connected to the rear end part of the top surface of the board 9, while wiring 302 (two lead wires) of the steering-use motor 111 and wiring 303 (three lead wires) of the potentiometer 115 are respectively connected to the front end part of the top surface of the board 9. The drive motor 101, the steering-use motor 111, and the potentiometer 115 are electrically connected through the wiring to the board 9 and are supplied with electric power from the battery 12.

Next, referring to FIG. 11, the electronic components on the bottom surface of the board 9 will be explained. As shown in FIG. 11, the charging port 8, a control device 96 covered by a shield, an inertial measurement unit (IMU) 97, and a battery-use connector 98 are mounted on the bottom surface of the board 9.

The board 9 overlaps the battery 12 in the front-rear direction and has extension parts (a right extension part 100a and a left extension part 100b) extending to the outside from the battery 12 in the vehicle width direction. The charging port 8 and the battery-use connector 98 are mounted on the bottom surface of one of the extension parts (in the present embodiment, the right extension part 100a). Due to this, the space at the outside of the battery can be effectively utilized.

As will be understood from FIG. 11, the extension parts 100a, 100b respectively include side regions 90a, 90b extending to the outsides from the innermost parts of the front wheels 3 and rear wheels 4 in the vehicle width direction, and the charging port 8 is mounted on the side region 90a. Similarly, the switch 91, the first antenna 92, the second antenna 93, and the wireless communication IC 94 arranged at the top surface of the board 9 shown in FIG. 5 and FIG. 6 are also mounted on the side regions 90a, 90b. By mounting a plurality of electronic components on the top surface and bottom surface of the side regions like in the present embodiment, it is possible to more efficiently make use of the space between the front wheels 3 and rear wheels 4.

The charging port 8, as explained above, is used for charging the battery 12 and supplies electric power from an outside power source to the battery 12. As shown in FIG. 11, the charging port 8 is arranged at the inside from the outermost parts of the wheels in the vehicle width direction (in the present embodiment, the outermost parts of the rear wheels 4). Due to this, the wheels can protect the charging port 8 from impact from the sides. Further, in the present embodiment, as will be understood from FIG. 2, the outermost part of the side part of the vehicle body 2 at which the charging port 8 is provided (in the present embodiment, the opening lid 20 and the main cover 21) is positioned at the outside from the outermost part of the wheel in the vehicle width direction. For this reason, the vehicle body 2 can also protect the charging port 8 from impact from the side. Note that, the outermost parts of the front wheels 3 may be arranged at the outsides from the outermost parts of the rear wheels 4 and the charging port 8 may be arranged at the inside from the outermost parts of the front wheels 3 in the vehicle width direction. Further, the charging port 8 may be arranged at the inside from the outermost parts of the front wheels 3 and the outermost parts of the rear wheels 4 in the vehicle width direction.

The control device 96 has a CPU etc., and performs various control operations of the self-propelled toy 1. The control device 96 is, for example, configured as an SOC (System on Chip) and is electrically connected to other components on the board 9. As shown in FIG. 11, the control device 96 is arranged at a region near the center of the vehicle width direction. Specifically, it is arranged on the centerline CL of vehicle width. By doing this, it is possible to dissipate heat generated at the control device 96 to the surrounding parts of the board 9 and improve the heat radiating performance of the self-propelled toy 1.

The IMU 97 includes a three-axis acceleration sensor and a three-axis gyro sensor (angular velocity sensor) and functions as a six-axis sensor detecting the acceleration in three axial directions and angular velocity in three axial directions. For example, the control device 96 controls the posture of the self-propelled toy 1 based on the output of the IMU 97. As shown in FIG. 11, the IMU 97 is arranged in a region near the center in the vehicle width direction, specifically, is arranged on the centerline CL of vehicle width. Due to this, it is possible to reduce the effect due to the left-right difference in operation of the self-propelled toy 1. Further, in the present embodiment, the IMU 97 is arranged at the front from the charging port 8, the control device 96, and the battery-use connector 98.

Wiring of the battery 12 (for example lead wires) is connected to the battery-use connector 98. The electric power stored in the battery 12 is connected through the battery-use connector 98 to the board 9. As shown in FIG. 11, the battery-use connector 98 is arranged at the front from the charging port 8 and the control device 96 and is arranged at the inside from the charging port 8 in the vehicle width direction.

Further, the battery-use connector 98 has the greatest height (thickness) among the electronic components mounted on the bottom surface of the board 9. Therefore, in the present embodiment, the electronic components mounted on the extension parts 100a, 100b of the board 9 are positioned the lowest among the electronic components mounted on the bottom surface of the board 9. For this reason, if, like in the present embodiment, the board 9 is arranged above the battery 12, it is possible to reduce the length in the vertical direction of the board 9 on which the electronic components are mounted and the battery 12. Note that, other electronic components arranged at the extension parts 100a, 100b (for example, the charging port 8) may have the greatest height.

Figure 12:
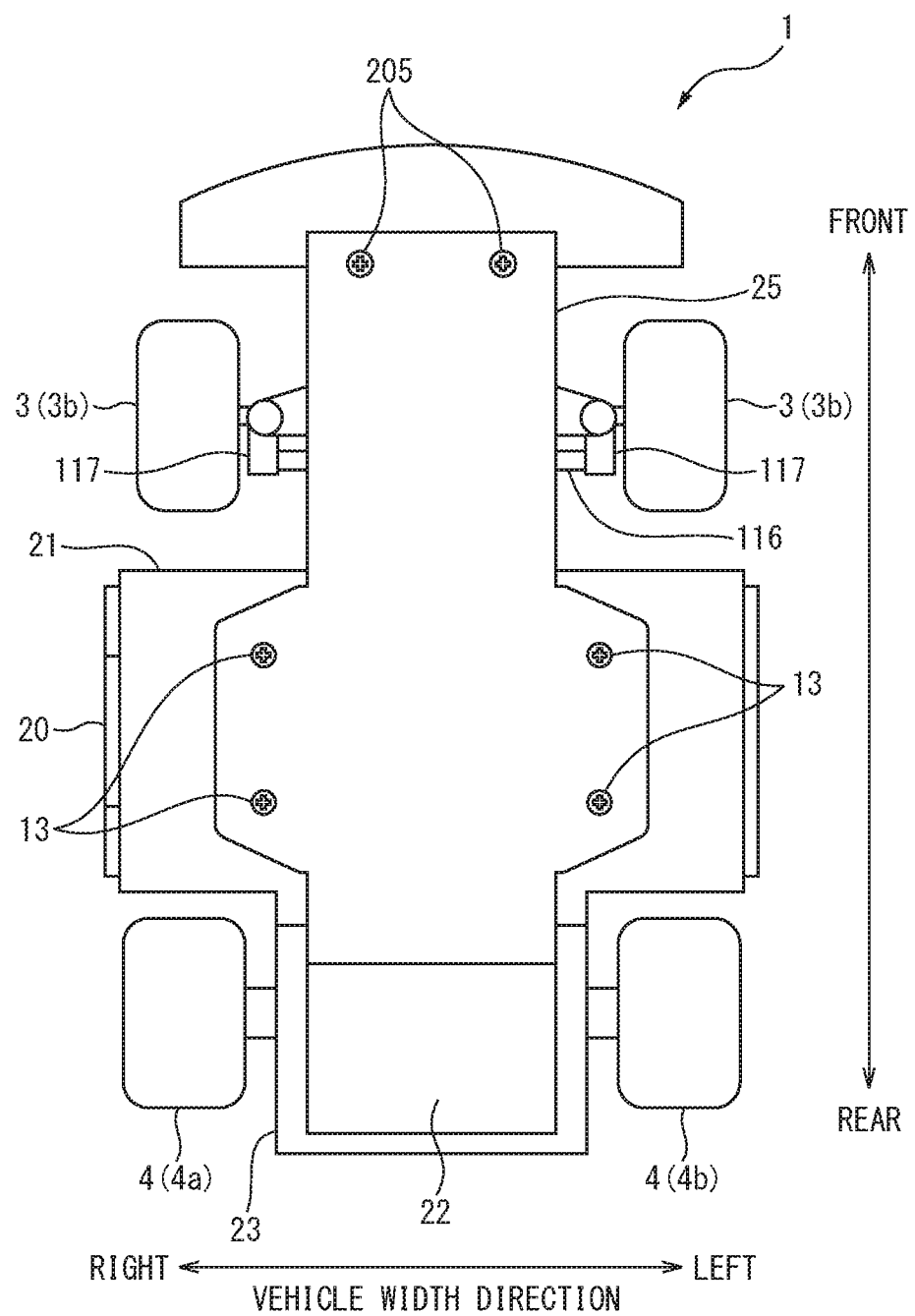
FIG. 12 is a bottom view of the self-propelled toy.

FIG. 12 is a bottom view of the self-propelled toy 1. As shown in FIG. 12, the vehicle body 2 includes a bottom cover 25. In the present embodiment, the vehicle body 2 is comprised of the opening lid 20, the main cover 21, the main chassis 22, the drive part cover 23, the steering part cover 24, and the bottom cover 25.

Figure 13:
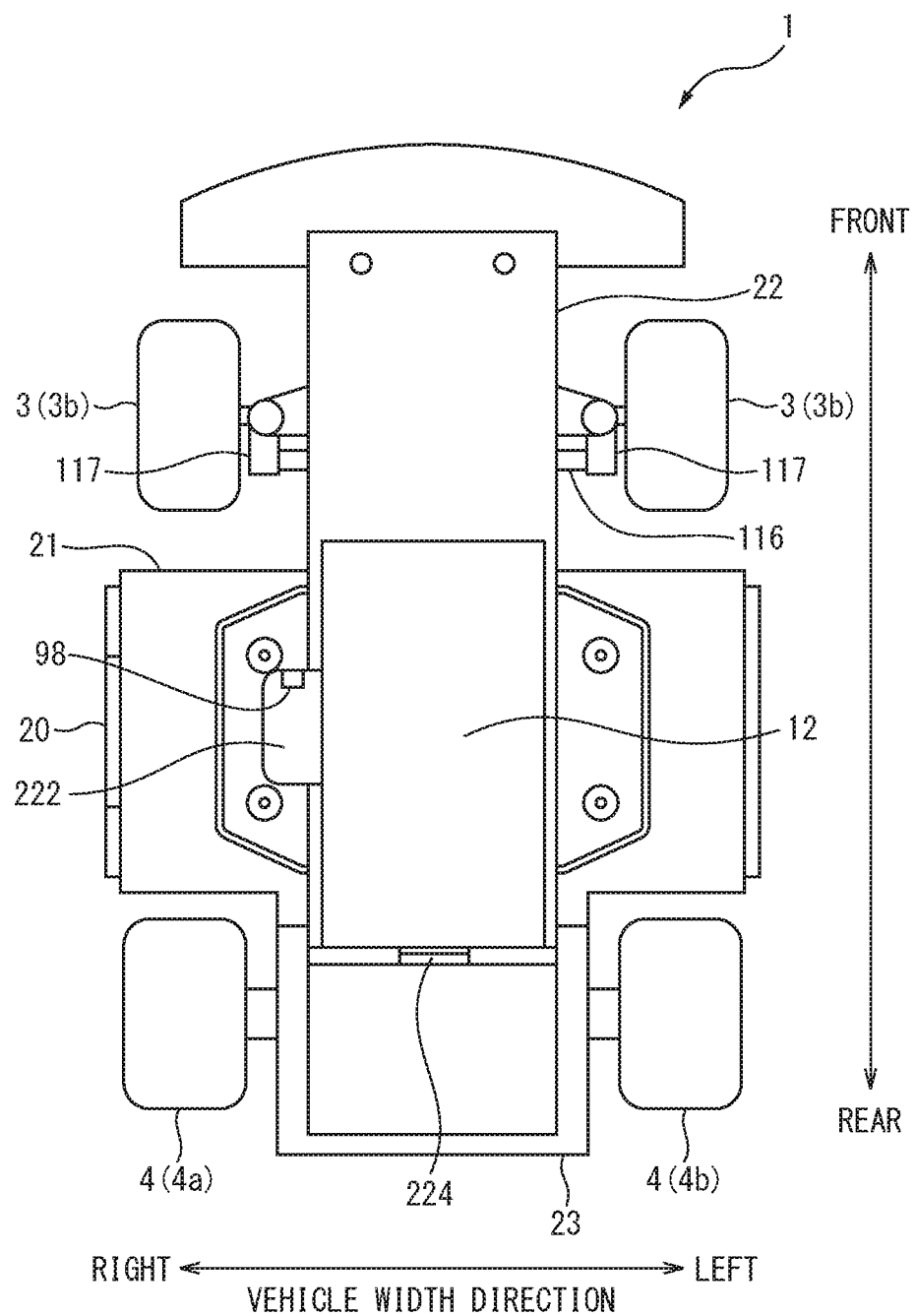
FIG. 13 is a bottom view of the self-propelled toy showing a battery.

FIG. 13 is a bottom view of the self-propelled toy 1 showing the battery 12. FIG. 13 shows the self-propelled toy 1 when the bottom cover 25 is detached. The bottom cover 25 extends in the front-rear direction from the front from the front wheels 3 to the rear wheels 4 and covers the battery 12 so that the battery 12 cannot be seen from the outside. The bottom cover 25 is attached to the main chassis 22, and the bottom cover 25 and the main chassis 22 form the bottom part (bottom surface) of the vehicle body 2. Further, the flat bottom surface of the bottom cover 25 forms the bottom surface of the vehicle body 2.

As explained above, the board 9 is attached to the top part of the main chassis 22, while as will be understood from FIG. 7 and FIG. 13, the battery 12 is attached to the bottom part of the main chassis 22. By doing this, it is possible to effectively utilize the spaces above and below the main chassis 22. Further, by arranging the battery 12, which is the heaviest component, near the bottom part of the vehicle body 2, it is possible to lower the center of gravity of the self-propelled toy 1 and in turn possible to improve the running performance of the self-propelled toy 1. Further, the user can detach the bottom cover 25 and easily access the battery 12, and therefore replacement and disposal of the battery 12 become easy.

Figure 14:
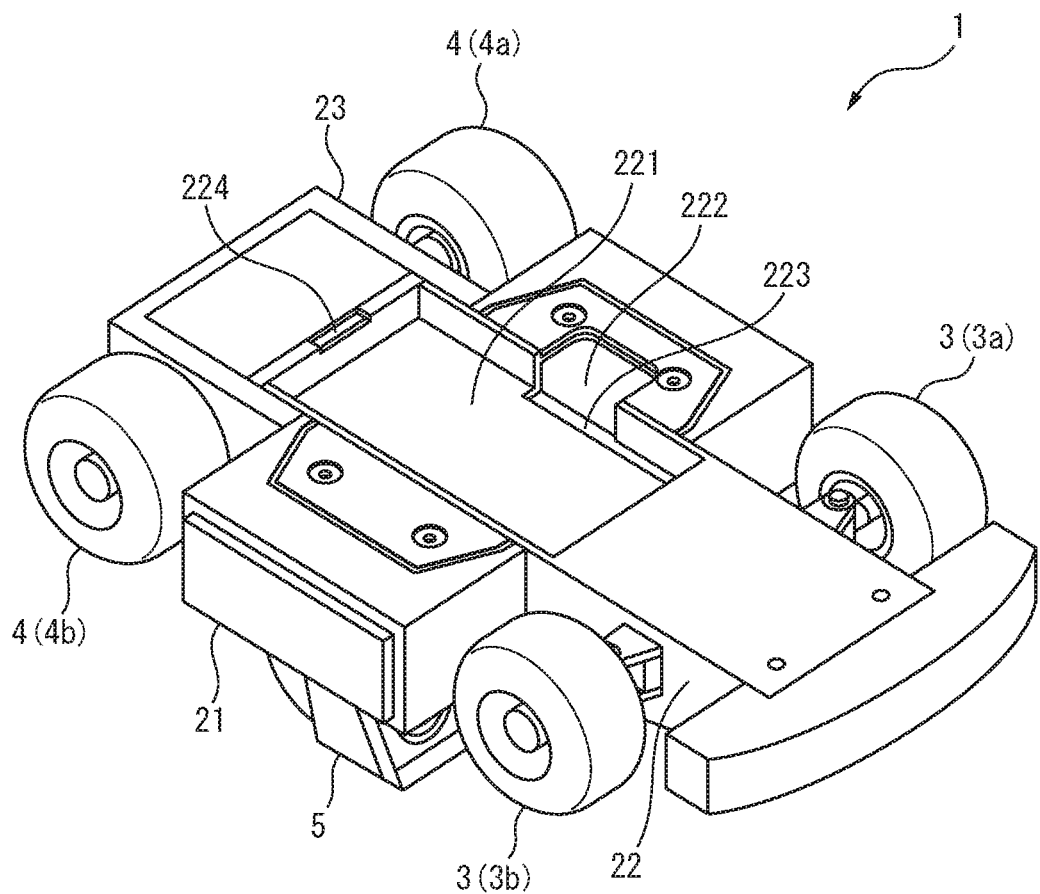
FIG. 14 is a perspective view of the self-propelled toy showing a bottom part of a main chassis.

FIG. 14 is a perspective view of the self-propelled toy 1 showing the bottom part of the main chassis 22. FIG. 14 shows the self-propelled toy 1 when the bottom cover 25 and the battery 12 are detached. At the bottom part of the main chassis 22, a first recessed part 221 is formed. The battery 12 is housed in the first recessed part 221. For example, the battery 12 is fixed to the bottom part of the main chassis 22 by adhesive tape provided at the first recessed part 221.

Further, at the side wall of the first recessed part 221, a through hole 222 is formed. At the bottom of the first recessed part 221, a second recessed part 223 communicating with the through hole 222 is formed. The through hole 222 and the second recessed part 223 are formed so as to adjoin the battery-use connector 98 on the bottom surface of the board 9. The second recessed part 223 houses the wiring of the battery 12. The wiring of the battery 12 passes through the through hole 222 and is connected to the battery-use connector 98. Due to this, it is possible to use the box shaped first recessed part 221 to surround the major part of the battery 12 without increasing the outside shape of the main chassis 22 and possible to secure the strength of main chassis 22 around the battery 12. Further, it is possible to shorten the length of the wiring of the battery 12 connecting the battery 12 arranged below the main chassis 22 to the battery-use connector 98 arranged above the main chassis 22. Further, it is possible to shorten the length of the wiring of the battery 12 in the vertical direction.

Further, as shown in FIG. 13 and FIG. 14, an insertion hole 224 is formed at the bottom part of the main chassis 22 between the right rear wheel 4a and the left rear wheel 4b. The rear end part of the bottom cover 25 is inserted into the insertion hole 224 and engages with the main chassis 22. On the other hand, as shown in FIG. 12, the front end part of the bottom cover 25 is fixed by screws 205 to the bottom part of the main chassis 22.

However, in order to reduce the vibration of the bottom cover 25 in the vertical direction while running, it is necessary to limit movement of the bottom cover 25 in the vertical direction between the front end part and rear end part of the bottom cover 25. For example, it may be considered to fix the bottom cover 25 to the main chassis 22 by screws etc., between the front wheels 3 and the rear wheels 4. However, if a force twisting the vehicle body 2 is applied to the self-propelled toy 1, the bottom cover 25 and the main chassis 22 are twisted. At this time, if the bottom cover 25 and the main chassis 22 are strongly fixed in the vertical direction, the frictional force of these fastening parts etc., causes the twisting to be remained. As a result, the balance of ground contact of the four wheels 3, 4 is lost and a difference is liable to arise in the ability of the self-propelled toy 1 to turn to the left and the right.

Therefore, in the present embodiment, movement of the bottom cover 25 in the vertical direction is limited so that the bottom cover 25 is not strongly fixed to the main chassis 22. Specifically, the self-propelled toy 1 includes a limiting member limiting movement of the bottom cover 25 in the vertical direction so that a clearance is formed above the bottom cover 25. By doing this, it is possible to keep the running performance of the self-propelled toy 1 from falling while reducing vibration of the bottom cover 25 in the vertical direction.

For example, the bottom cover 25 is fixed to the main chassis 22 through a spacer member placed between the main chassis 22 and the bottom cover 25, and stepped screws 13 shown in FIG. 12 are used as limiting members. In the present embodiment, the main cover 21 functions as the spacer member. The bottom cover 25 and the main cover 21 are fixed to the main chassis 22 by four stepped screws 13 arranged between the front wheels 3 and rear wheels 4.

Figure 15:
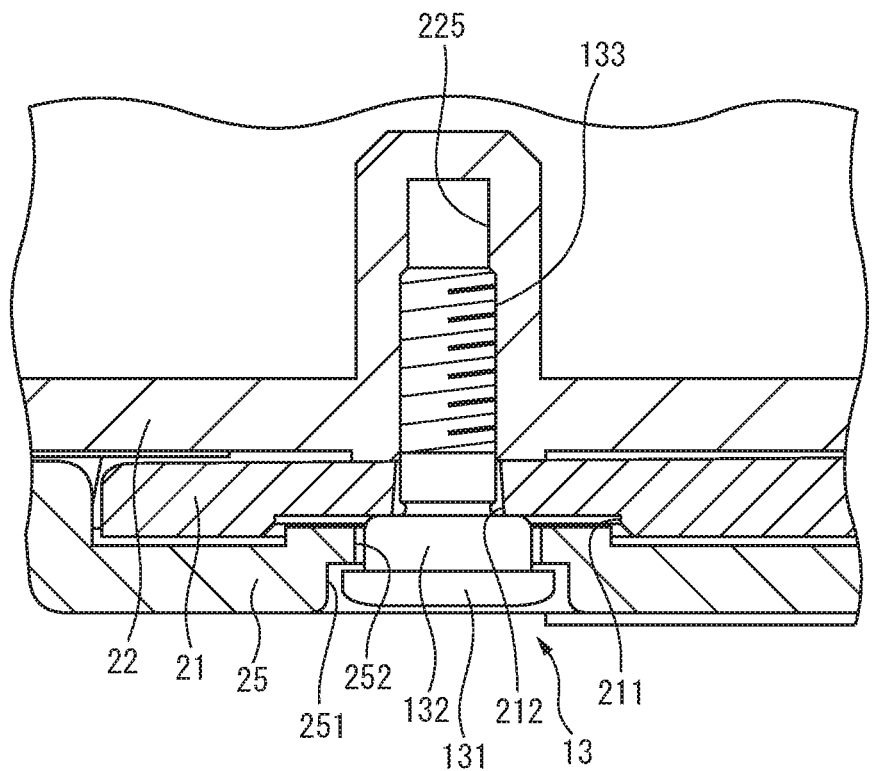
FIG. 15 is an enlarged side cross-sectional view of the self-propelled toy showing an area around a stepped screw.

FIG. 15 is an enlarged side cross-sectional view of the self-propelled toy 1 showing the surroundings of the stepped screw 13. The stepped screw 13 has a head part 131, a step part 132, and a thread part 133. The diameter of the step part 132 is larger than the diameter of the thread part 133 and the diameter of the head part 131 is larger than the diameter of the step part 132.

A first housing hole 251 housing the head part 131 and a first through hole 252 allowing passage of the step part 132 are formed at the bottom cover 25. The circular first housing hole 251 has a diameter larger than the head part 131 and has an axial direction length longer than the head part 131. The circular first through hole 252 has a diameter larger than the step part 132 and smaller than the head part 131 and has an axial direction length shorter than the step part 132. The first through hole 252 is communicated with the first housing hole 251.

A second housing hole 211 housing the step part 132 and a second through hole 212 allowing passage of the thread part 133 are formed at the main cover 21. The circular second housing hole 211 has a diameter larger than the step part 132 and has an axial direction length shorter than the step part 132. The surroundings of the second housing hole 211 are chamfered, and a clearance is provided between the bottom cover 25 housed in the second housing hole 211 and the peripheral wall of the second housing hole 211. The circular second through hole 212 has a diameter larger than the thread part 133 and smaller than the step part 132 and has an axial direction length shorter than the thread part 133. The second housing hole 211 is communicated with the first through hole 252, while the second through hole 212 is communicated with the second housing hole 211.

A screw hole 225 into which the thread part 133 is inserted is formed at the main chassis 22. The screw hole 225 is threaded in advance or is threaded at the time of insertion of the thread part 133. The screw hole 225 communicates with the second through hole 212.

When the stepped screw 13 is inserted into the main chassis 22, in the axial direction, the step part 132 abuts against the main cover 21 (specifically, bottom surface of the second housing hole 211) and the head part 131 is spaced apart from the bottom cover 25 (specifically, bottom surface of the first housing hole 251). As a result, the main cover 21 abuts against the main chassis 22 and the bottom cover 25 is spaced apart from the main cover 21.

That is, the stepped screw 13 fixes the main cover 21 to the main chassis 22 so that the main cover 21 abuts against the main chassis 22 and limits movement of the bottom cover 25 in the vertical direction so that a clearance is formed between the bottom cover 25 and the main cover 21. Therefore, in the present embodiment, it is possible to limit movement of the bottom cover 25 in the vertical direction while using a single component (the stepped screw 13) to strongly fix the main cover 21 to the main chassis 22.

Note that, the second housing hole 211 of the main cover 21 may be omitted and the step part 132 of the stepped screw 13 may abut against the bottom surface of the main cover 21. Further, a general screw not having a step part may be used to fix the main cover 21 to the main chassis 22 and an engagement member such as a hook may be used as the limiting member. In this case, for example, the engagement member extends from the main chassis 22 or the main cover 21 and engages with the bottom cover 25 so that a clearance is formed between the bottom cover 25 and the main cover 21. Further, the spacer member such as the main cover 21 may be omitted and a limiting member such as a general screw, a stepped screw or an engagement member may be used to limit movement of the bottom cover 25 in the vertical direction so that a clearance is formed between the bottom cover 25 and the main chassis 22.

Figure 16:
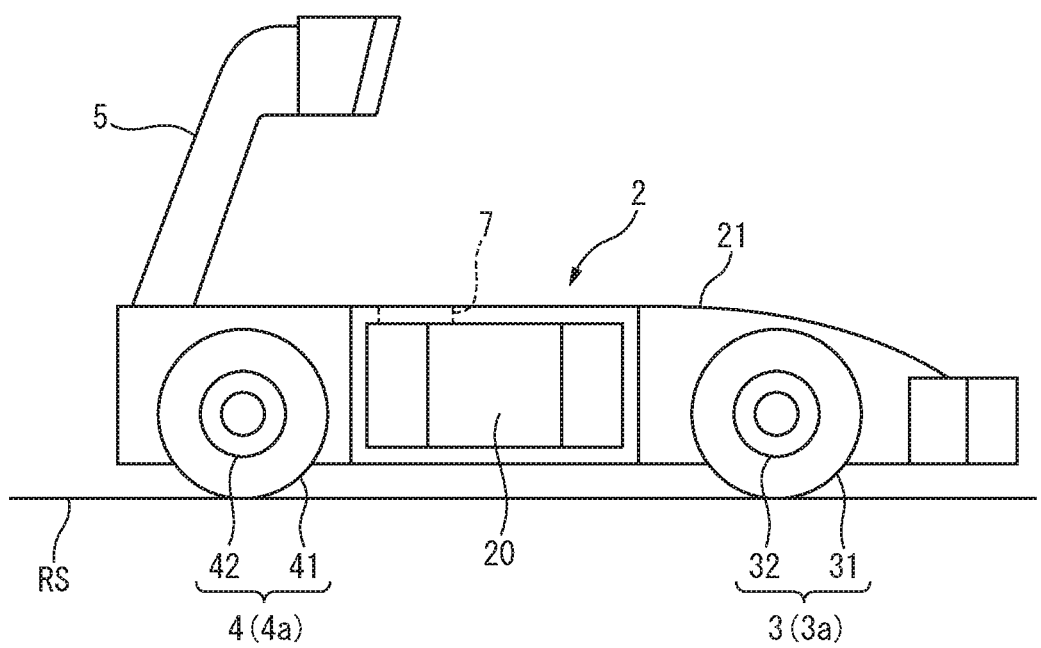
FIG. 16 is a right side view of the self-propelled toy set horizontally on a running surface.

FIG. 16 is a right side view of the self-propelled toy 1 placed horizontally on the running surface RS. FIG. 16 shows a part of the operating part 7 by broken lines in order to show the position of the operating part 7. As explained above, the user operates the operating part 7 in order to directly or indirectly make the imaging device 6 operate. As shown in FIG. 16, when the self-propelled toy 1 is placed on the running surface RS, if the operating part 7 is operated by a strong force, the self-propelled toy 1 is liable to be subjected to an excessive downward force. This is particularly remarkable in the case where the operating part 7 is a button which is pressed downward. Further, the self-propelled toy 1 placed on the running surface RS is liable to be struck by a falling object etc., causing an excessive downward force to be applied to the self-propelled toy 1.

As opposed to this, in the present embodiment, the vehicle body 2 and wheels 3, 4 are configured so that when a downward force causes the tires 31, 41 to be flattened, the bottom surface of the vehicle body 2 touches the running surface RS. By doing this, before excessive force is applied to the wheel shaft 105 through the tire wheels 42 of the wheels 4, the downward force can be received by the vehicle body 2 with hither strength than the wheel shaft 105. Further, at this time, the bottom surface of the vehicle body 2 planarly contacts the running surface RS, and therefore the force per unit area which the vehicle body 2 receives can be made smaller. Therefore, due to the above configuration, it is possible to improve the durability of the self-propelled toy 1 when a downward force is applied.

Note that, when the downward force is released, the flattened tires 31, 41 recover to their original forms and the vehicle body 2 again separates from the running surface RS. Therefore, the vehicle body 2 is configured so that when a downward force is applied in its normal state (static state), its bottom surface touches the running surface RS and when the downward force is released, it returns to the normal state.

The specific configurations of the vehicle body 2 and wheels 3, 4 in the present embodiments are as follows: The tires 31, 41 of the wheels 3, 4 are respectively configured to be flattened by a load smaller than the load where permanent distortion occurs at the wheel shaft 105 connecting the tire wheels 42. Specifically, each of the tires 31, 41 is configured to be flattened when the load applied to one tire is 40N to 60N, preferably 50N. For example, the tires 31, 41 are configured as follow tires.

Further, the vehicle body 2 and the wheels 3, 4 are configured so that the lowest points of the tire wheels 32, 42 are positioned above the bottom surface of the vehicle body 2 and the distance in the vertical direction between the bottommost points of the tire wheels 32, 42 and bottom surface of the vehicle body 2 becomes greater than the thickness of the tires 31, 41. By doing this, the bottom surface of the vehicle body 2 touches the running surface RS before the tires 31, 41 are completely flattened and the downward force can be received by the bottom surface of the vehicle body 2.

Further, in order to receive the downward force by the bottom surface of the vehicle body 2 while securing the desired lowest height from the ground, it is necessary to raise the lowest points of the tire wheels 32, 42. Further, in order to raise the lowest points of the tire wheels 32, 42 without excessively increasing the diameters of the tires 31, 41, that is, the diameters of the wheels 3, 4, it is necessary to increase the diameters (rim diameters) of the tire wheels 32, 42, that is, to raise the ratio of the outside diameters of the tires 31, 41 to the inside diameters of the tires 31, 41.

For example, the lowest height from the ground, that is, the distance between the running surface RS and the bottom surface of the vehicle body 2, is set to 5 mm to 10 mm, preferably is set to 6 mm. The ratio of the outside diameters of the tires 31, 41 to the inside diameters of the tires 31, 41 is set to 1:1.5 to 1:3, preferably is set to 1:2. By doing this, in addition to improving the durability of the self-propelled toy 1, it becomes possible to enable the self-propelled toy 1 to ride over small level differences (carpet etc.) on the running surface RS while realizing smaller size of the self-propelled toy 1.

Note that, as long as the vehicle body 2 and wheels 3, 4 are configured so that the bottom surface of the vehicle body 2 touches the running surface RS when a downward force causes the tires 31, 41 to be flattened, the tires 31, 41 may be pneumatic tires or solid tires.

Second Embodiment

The configuration and control of the self-propelled toy according to the second embodiment are basically the same as the configuration and control of the self-propelled toy according to the first embodiment except for the points explained below. Therefore, below, the second embodiment of the present disclosure will be explained centered on parts different from the first embodiment.

Figure 17:
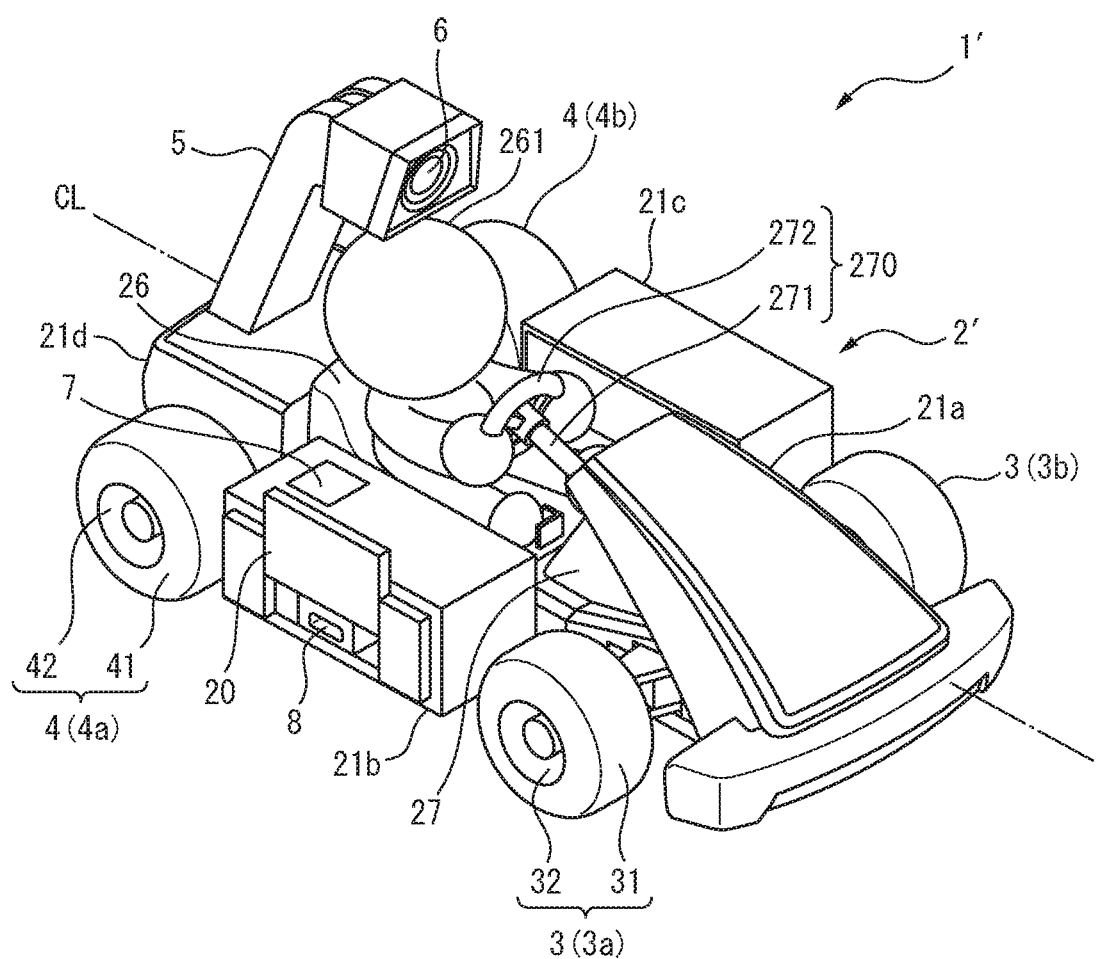
FIG. 17 is a perspective view of a self-propelled toy according to a second embodiment of the present disclosure.
Figure 18:
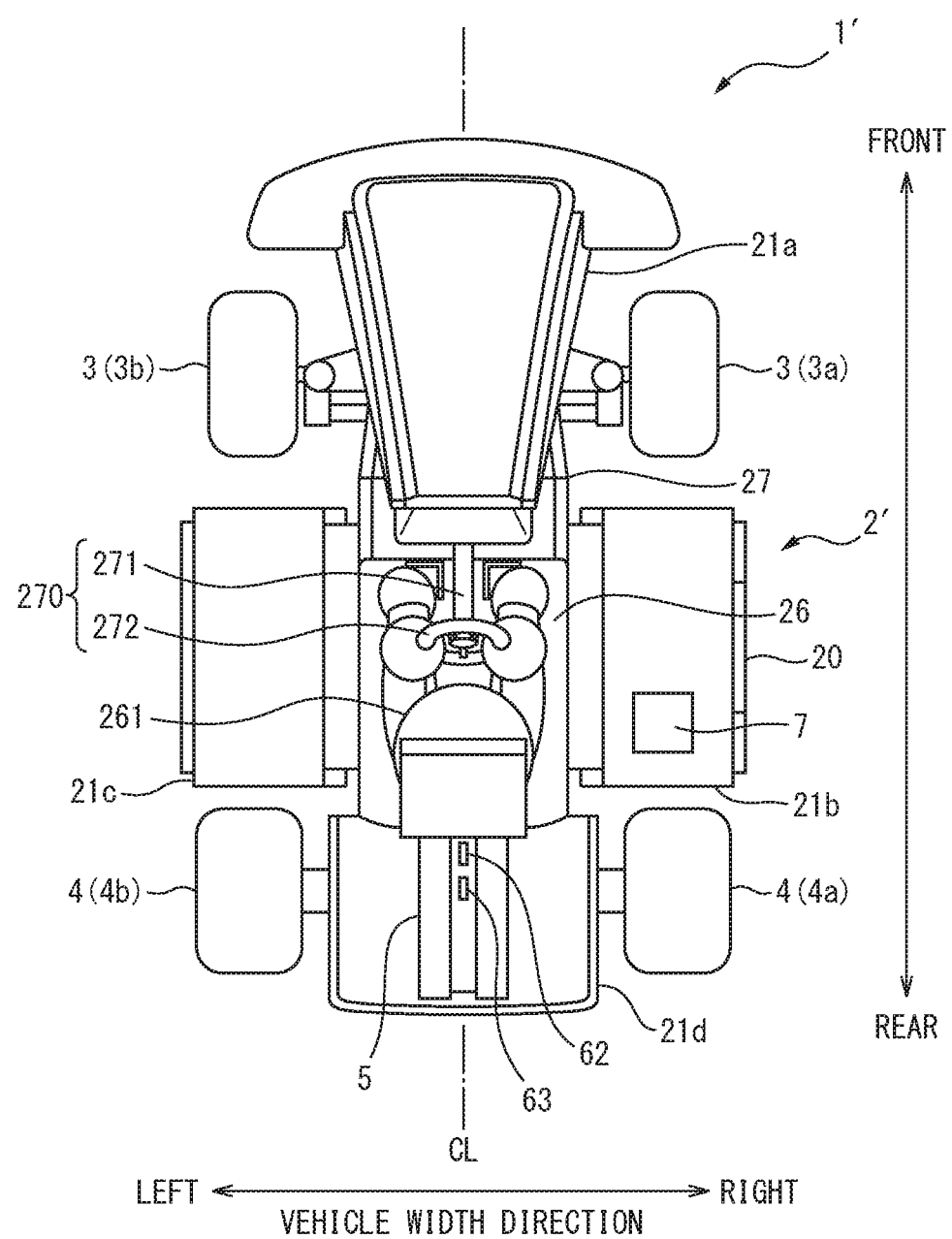
FIG. 18 is a top view of the self-propelled toy according to the second embodiment of the present disclosure.

FIG. 17 is a perspective view of a self-propelled toy 1' according to the second embodiment of the present disclosure, and FIG. 18 is a top view of the self-propelled toy 1' according to the second embodiment of the present disclosure. The self-propelled toy 1' has a substantially symmetrical shape about the centerline CL of vehicle width.

As shown in FIG. 17, in the same way as the first embodiment, the self-propelled toy 1' includes a vehicle body 2', wheels (front wheels 3 and rear wheels 4) connected to the vehicle body 2', a support arm 5 extending upward from the vehicle body 2', an imaging device 6 supported by the support arm 5, and an operating part 7 and charging port 8 provided at the vehicle body 2'.

In the second embodiment, the vehicle body 2' includes, instead of the main cover 21, a front cover 21a forming the top part and the side parts of the self-propelled toy 1', two side covers forming the top part and the side parts of the self-propelled toy 1' (a right side cover 21b and a left side cover 21c), and a rear cover 21d forming the top part and the rear part of the self-propelled toy 1'. The outer shapes of these covers 21a, 21b, 21c, and 21d in the top view of the self-propelled toy 1' (FIG. 18) are substantially the same as the outer shape of the main cover 21 shown in FIG. 2.

Further, the vehicle body 2' includes a driving seat 26 at which a figurine 261 is provided. The driving seat 26 has a seat surface and a backrest. The front, rear, left, and right of the driving seat 26 are surrounded by the covers 21a, 21b, 21c and 21d, and the driving seat 26 is open above it. The figurine 261 has arms, legs, a body and a head, and is seated at the driving seat 26.

As shown in FIG. 18, the driving seat 26 is arranged between the front wheels 3 and rear wheels 4 in the front-rear direction. Further, in the vehicle width direction, the driving seat 26 is arranged at the insides of the front wheels 3 and rear wheels 4 and arranged in the region near the center. In particular, in the present embodiment, the driving seat 26 is arranged so that the centerline and the median plane of the figurine 261 match the centerline CL of vehicle width. Due to this, it is possible to keep the balance of weights of the left and right of the self-propelled toy 1 from deteriorating and in turn possible to keep the running performance of the self-propelled toy 1 from falling.

As shown in FIG. 17 and FIG. 18, the support arm 5 extends from the rear of the driving seat 26 to above the figurine 261 upward at a slant so that the imaging device 6 is arranged right above the head part of the figurine 261. By doing this, it is possible to utilize the space at the rear of the driving seat 26 to clearly capture the front area of the self-propelled toy 1' without the support arm 5 blocking the front of the figurine 261.

As shown in FIG. 17, in the second embodiment, the operating part 7 is provided at the top part of the right side cover 21b, the charging port 8 is provided at the side part of the right side cover 21b, and the opening lid 20 forms the right side part of the vehicle body 2' together with the right side cover 21b. The positions of the support arm 5, the imaging device 6, the operating part 7, and the charging port 8 with respect to the vehicle body 2' and wheels 3, 4 are similar to the first embodiment.

Figure 19:
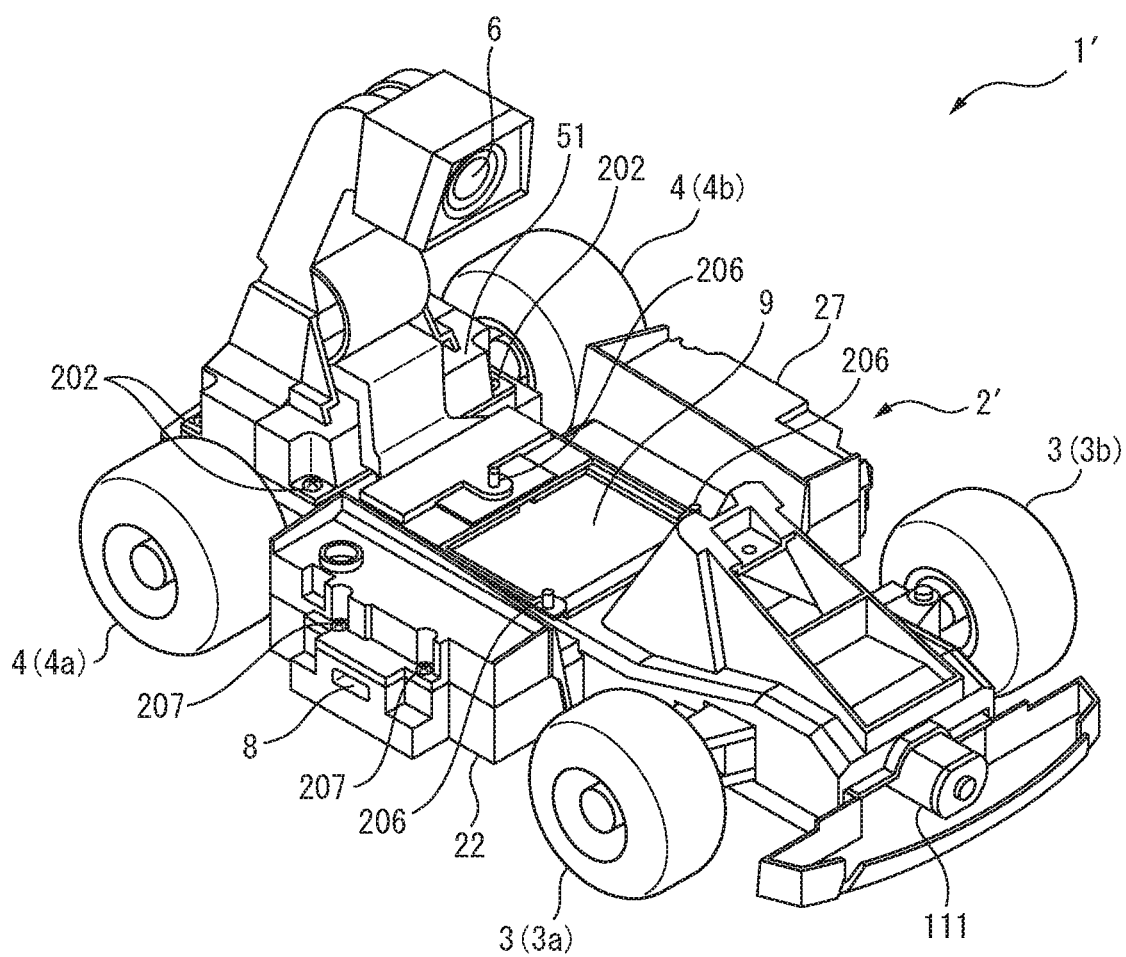
FIG. 19 is a perspective view of the self-propelled toy showing the inside of the vehicle body.

FIG. 19 is a perspective view of the self-propelled toy 1' showing the inside of the vehicle body 2'. FIG. 19 shows the self-propelled toy 1' when the front cover 21a, the side covers 21b, 21c, the rear cover 21d, and the driving seat 26 are detached. As shown in FIG. 19, the vehicle body 2' includes a middle housing 27. In the second embodiment, the vehicle body 2' is comprised of the opening lid 20, the front cover 21a, the side covers 21b, 21c, the rear cover 21d, the main chassis 22, the drive part cover 23, the steering part cover 24, the bottom cover 25, the driving seat 26, and the middle housing 27.

The middle housing 27 is arranged above the main chassis 22 and holds the driving seat 26. The driving seat 26 is attached to the top part of the middle housing 27. In the present embodiment, the driving seat 26 is fixed to the top part of the middle housing 27 by bolts 206.

The self-propelled toy 1' in which the middle housing 27 is detached is similar to the self-propelled toy 1 in the first embodiment and is shown in FIG. 5. The middle housing 27 is attached to the top part of the main chassis 22 so as to cover the steering part cover 24, the board 9, and the camera-use FPC 61 shown in FIG. 5. In the present embodiment, the middle housing 27 is fixed by screws 207 to the top part of the main chassis 22.

Further, as shown in FIG. 17 and FIG. 18, a grip part 270 comprised of the steering shaft 271 and the steering wheel 272 is attached to the middle housing 27. The steering shaft 271 extends from the middle housing 27. The steering wheel 272 is attached to the front end of the steering shaft 27 and is gripped by the figurine 261. Note that, the middle housing 27 may be omitted and the driving seat 26 may be attached to the top part of the main chassis 22. In this case, the grip part 270 is attached to the main chassis 22 or the driving seat 26.

Figure 20:
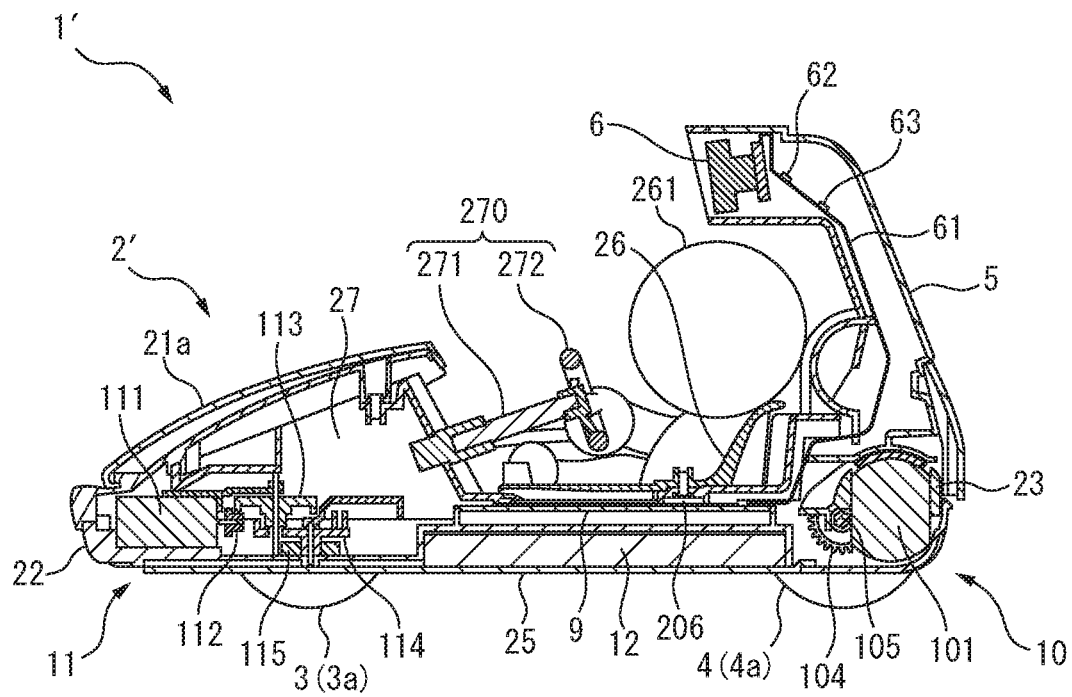
FIG. 20 is a left side cross-sectional view of the self-propelled toy along the centerline of the vehicle width.

FIG. 20 is a left side cross-sectional view of the self-propelled toy 1' along the centerline CL of vehicle width. As shown in FIG. 20, the driving seat 26 is arranged above the battery 12 and board 9 in the vertical direction and is arranged at the front from the drive member 10 and at the rear from the steering member 11 in the front-rear direction. Due to this, it is possible to efficiently utilize spaces in front of, behind and below the driving seat 26.

Further, as explained above, among the components held at the main chassis 22, the drive motor 101 is greatest in length in the vertical direction and the steering-use motor 111 is second longest in length in the vertical direction. For this reason, by arranging the drive motor 101 and the steering-use motor 111 in front of and behind the driving seat 26, the vehicle body 2 can be kept from becoming longer in length in the vertical direction. Further, the support arm 5 is connected to the vehicle body 2 right above the drive motor 101. By doing this, it is possible to effectively utilize the space behind the driving seat 26 and decrease the total length of the self-propelled toy 1'.

Further, as will be understood from FIG. 5 and FIG. 19, the switch 91, the first antenna 92, the second antenna 93 and the wireless communication IC 94 overlap the driving seat 26 in the front-rear direction and are mounted on the top surface of the board 9 at the outside from the driving seat 26 in the vehicle width direction. Due to this, it is possible to effectively utilize the space at the outside of the driving seat 26. Further, as will be understood from FIG. 5 and FIG. 20, the camera-use FPC 61 is arranged right below the backrest of the driving seat 26. By utilizing the dead space below the backrest in this way, it is possible to lower the position of the seat surface of the driving seat 26 without increasing the total length of the self-propelled toy 1.

Further, in the same way as the first embodiment, the bottom cover 25 is fixed to the main chassis 22 through a spacer member arranged between the main chassis 22 and the bottom cover 25, and the stepped screws 13 shown in FIG. 12 are used as limiting members. In the second embodiment, the right side cover 21b functions as the spacer member, and the stepped screws 13 fasten the right side cover 21b to the main chassis 22 so that the right side cover 21b abuts against the main chassis 22, and limit movement of the bottom cover 25 in the vertical direction so that a clearance is formed between the bottom cover 25 and the right side cover 21b.

Third Embodiment

The configuration and control of the self-propelled toy used in the third embodiment are basically the same as the configuration and control of the self-propelled toy according to the first embodiment except for the points explained below. Therefore, below, the third embodiment of the present disclosure will be explained centered on parts different from the first embodiment.

Figure 21:
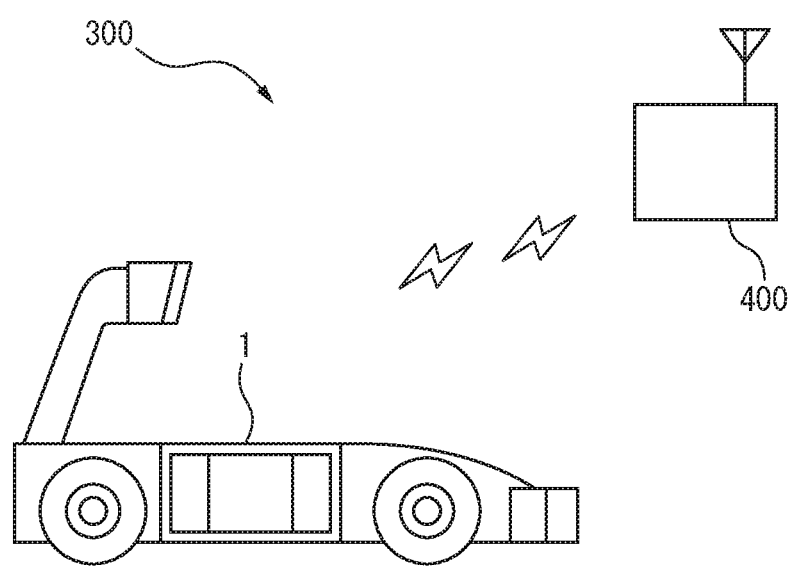
FIG. 21 is a schematic view of the configuration of a game system according to a third embodiment of the present disclosure.

FIG. 21 is a schematic view of the configuration of a game system 300 according to the third embodiment of the present disclosure. The game system 300 includes a self-propelled toy 1 and a remote control device 400. The remote control device 400 is separate from the self-propelled toy 1, and includes, for example, a control part such as a CPU, a storage part such as a memory, an operating part such as a steering wheel or stick, a display part such as a display, etc.

The self-propelled toy 1 and the remote control device 400 can communicate with each other by Wi-Fi®, Bluetooth®, or other short distance wireless communication. The self-propelled toy 1, for example, sends state quantities of the self-propelled toy 1 detected by a sensor (IMU 97 etc.) provided at the self-propelled toy 1 and images captured by the imaging device 6 to the remote control device 400. On the other hand, the remote control device 400, for example, sends control signals for controlling the self-propelled toy 1 to the self-propelled toy 1 to thereby remotely control the self-propelled toy 1.

Other Embodiments

Above, preferred embodiments according to the present disclosure were explained, but the present disclosure is not limited to these embodiments and can be corrected and changed in various ways. For example, the specific configurations and arrangements of the respective components of the self-propelled toys 1, 1' may differ from the above.

Further, the self-propelled toys 1, 1' may be two-wheeled motorcycles, three-wheeled motorcycles or automobiles, six-wheeled or more automobiles, etc. That is, the number of wheels of the self-propelled toys 1, 1' may be other than four. Further, the self-propelled toys 1, 1' may be endless track types, so-called Caterpillar® types, with belts wound around the wheels. Further, the wheels may be omitted and the self-propelled toys 1, 1' may be motorboats etc., able to run on the water.

Further, the steering member 11 may be omitted and the self-propelled toys 1, 1' may be configured to proceed straight or may be configured to run along a running course. Further, either of the first antenna 92 and the second antenna 93 may be omitted. Further, the first antenna 92, the second antenna 93, and the wireless communication IC 94 may be omitted. That is, the self-propelled toys 1, 1' need not have wireless communication function. In this case, for example, the image captured by the imaging device 6 is stored in a memory provided in the self-propelled toys 1, 1' and is taken out to the outside through the memory. Further, instead of the battery 12, a primary battery may be used and the charging port 8 may be omitted. Further, the support arm 5 may be omitted and the imaging device 6 may be directly connected to the vehicle bodies 2, 2' (for example, the main cover 21, the front cover 21*a*, etc.). Further, the support arm 5 may be integral with the vehicle bodies 2, 2' (for example, the main cover 21, the rear cover 21*d*, etc.)

Further, the above-mentioned embodiments can be implemented in any combination. For example, in the third embodiment, instead of the self-propelled toy 1 of the first embodiment, the self-propelled toy 1' of the second embodiment may be used. Further, in the self-propelled toy 1' of the second embodiment, instead of the front cover 21*a*, the side covers 21*b*, 21*c*, and the rear cover 21*d*, the main cover 21 may be used, and the main cover 21 may be configured to cover the driving seat 26 and the figurine 261. In this case, the main cover 21 may be at least partially transparent or semitransparent so that the figurine 261 is visible from the outside.

The invention claimed is:

1. A self-propelled toy including:
a vehicle body,
wheels connected to the vehicle body,
a battery positioned on the vehicle body,
a motor configured to use electric power stored in the battery to output drive power for running use,
an imaging device connected to the vehicle body and configured to capture an image of an area in front of the self-propelled toy,
an operating part configured to be operated by a user to operate the imaging device, and
a charging port configured to supply electric power from an outside power source to the battery,
wherein the operating part is positioned on a top part of the vehicle body on one side of a vehicle width centerline, and the charging port is positioned on a side part of the vehicle body on the same side of the vehicle width centerline as the operating part such that the operating part indicates the location of the charging port to the user.

2. The self-propelled toy according to claim 1, wherein the wheels include at least one front wheel and at least one rear wheel, and the operating part and the charging port are arranged between the at least one front wheel and the at least one rear wheel.

3. The self-propelled toy according to claim 1, wherein the charging port is positioned inward in a vehicle width direction of an outer side of the wheels that are on the same side of the vehicle width centerline as the charging port.

4. The self-propelled toy according to claim 1, wherein the side part of the vehicle body on which the charging port is positioned includes an outer side, the outer side of the side part being positioned outward in a vehicle width direction of an outer side of the wheels that are on the same side of the vehicle width centerline as the charging port.

5. The self-propelled toy according to claim 1, wherein the wheels are respectively comprised of a tire and a tire wheel,
the operating part is a button which is pressed downward, and
the vehicle body and the wheels are configured so that a bottom surface of the vehicle body touches a running surface when a downward force causes the tire to be flattened.

6. The self-propelled toy according to claim 1, wherein the wheels are respectively comprised of a hollow tire and a tire wheel,
the operating part is a button which is pressed downward, and
a lowermost point of the tire wheel is positioned above a bottom surface of the vehicle body, and a distance in a vertical direction between the lowermost point of the tire wheel and the bottom surface of the vehicle body is equal to or greater than a thickness of the hollow tire.

7. The self-propelled toy according to claim 1, further including:
a board on which a plurality of electronic components are mounted,
wherein the vehicle body includes a main chassis, and
the board is attached to a top part of the main chassis and the battery is attached to a bottom part of the main chassis.

8. The self-propelled toy according to claim 7, wherein the board has extension parts that overlap the battery in a front-rear direction and extend outwardly of the battery in a vehicle width direction, and
at least one electronic component among the plurality of electronic components is mounted on at least one bottom surface of the extension parts.

9. The self-propelled toy according to claim 8, wherein a switch turned on and off by the operating part is mounted on one top surface of the extension parts.

10. The self-propelled toy according to claim 8, wherein a recessed part that houses the battery is formed at a bottom part of the main chassis and a through hole is formed at a side wall of the recessed part, and
a connector is mounted on one bottom surface of the extension parts, and wiring of the battery is connected to the connector through the through hole.

11. The self-propelled toy according to claim 9, wherein the motor is a brushed motor, and
the extension parts are positioned in front of the motor, and at least one wireless communication antenna is mounted on at least one top surface of the extension parts in front of the switch.

12. The self-propelled toy according to claim 1, further including:

a board on which a plurality of electronic components are mounted, wherein the wheels include front wheels and rear wheels, the vehicle body includes a main chassis, the board is attached to a top part of the main chassis and has side regions extending to an outside from innermost parts of the front wheels and the rear wheels in a vehicle width direction between the front wheels and the rear wheels, and a switch turned on and off by the operating part is mounted on one top surface of the side regions.

13. The self-propelled toy according to claim 12, wherein the motor is a brushed motor, and the side regions are positioned in front of the motor, and at least one wireless communication antenna is mounted on at least one top surface of the side regions in front of the switch.

14. The self-propelled toy according to claim 1, wherein the vehicle body includes a main chassis and a bottom cover attached to the main chassis and forming a bottom part of the vehicle body, and the self-propelled toy further includes a limiting member configured to limit movement of the bottom cover in a vertical direction so that a clearance is formed above the bottom cover.

15. The self-propelled toy according to claim 14, wherein the vehicle body further includes a spacer member arranged between the main chassis and the bottom cover, and the limiting member is a stepped screw, fixes the spacer member to the main chassis so that the spacer member abuts against the main chassis, and limits movement of the bottom cover in a vertical direction so that a clearance is formed between the bottom cover and the spacer member.

16. The self-propelled toy according to claim 1, further including:

a support arm extending upward from the vehicle body and connecting the imaging device to the vehicle body, and at least one light emitting diode positioned on the support arm so as to be visible outside of the support arm.

17. The self-propelled toy according to claim 1, further including:

a board on which a plurality of electronic components are mounted, wherein the vehicle body includes a driving seat and a figurine is positioned in the driving seat, and the board is arranged below the driving seat, and a switch configured to be turned on and off by the operating part overlaps the driving seat in a front-rear direction and is mounted on the board offset from the driving seat in a vehicle width direction.

18. The self-propelled toy according to claim 1, further including:

a support arm that extends upward from the vehicle body and connecting the imaging device to the vehicle body, wherein the vehicle body includes a driving seat and a figurine is positioned in the driving seat, and the motor is arranged behind the driving seat and the support arm is connected to the vehicle body above the motor.

19. A game system including:

the self-propelled toy according to claim 1, and a remote control device configured to remotely control the self-propelled toy.

\* \* \* \* \*